United States Patent
Yamaguchi et al.

(10) Patent No.: US 9,439,046 B2
(45) Date of Patent: Sep. 6, 2016

(54) METHOD FOR MEASURING POSITION, NON-TRANSITORY RECORDING MEDIUM STORING POSITION MEASUREMENT PROGRAM, AND RADIO APPARATUS

(71) Applicant: Panasonic Intellectual Property Corporation of America, Torrance, CA (US)

(72) Inventors: Takahiro Yamaguchi, Osaka (JP); Toru Utsuki, Osaka (JP); Yasunori Sato, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/659,970

(22) Filed: Mar. 17, 2015

(65) Prior Publication Data

US 2015/0281911 A1    Oct. 1, 2015

Related U.S. Application Data

(60) Provisional application No. 61/971,114, filed on Mar. 27, 2014.

(30) Foreign Application Priority Data

Dec. 1, 2014  (JP) .................. 2014-243251

(51) Int. Cl.
  *H04W 4/04*   (2009.01)
  *H04W 72/04*  (2009.01)
  *H04W 4/02*   (2009.01)
  *H04W 64/00*  (2009.01)

(52) U.S. Cl.
  CPC ............. *H04W 4/043* (2013.01); *H04W 4/023* (2013.01); *H04W 64/00* (2013.01)

(58) Field of Classification Search
  CPC ... H04W 4/043; H04W 64/00; H04W 4/023; H04W 16/26
  USPC ......... 455/456.1, 456.2, 456.4; 342/448, 463
  See application file for complete search history.

(56) References Cited

U.S. PATENT DOCUMENTS

2009/0115661 A1*  5/2009 Torimoto ............... G01C 21/12
                                                    342/387
2015/0080014 A1*  3/2015 Ben-Yosef ............ H04W 4/043
                                                    455/456.1

FOREIGN PATENT DOCUMENTS

| CA | 2690542     | 12/2008 |
| JP | 2007-278756 | 10/2007 |
| JP | 2009-000656 | 1/2009  |
| JP | 2010-159980 | 7/2010  |

* cited by examiner

*Primary Examiner* — Sam Bhattacharya
(74) *Attorney, Agent, or Firm* — Greenblum & Bernstein, P.L.C.

(57) ABSTRACT

A radio apparatus transmits a radio signal including identification information for identifying the radio apparatus. A reception terminal receives the radio signal transmitted form the radio apparatus. A positional information management server obtains radio information in which the identification information included in the radio signal and radio field intensity of the radio signal are associated with each other and determines a position of the reception terminal using the obtained radio information. The radio apparatus includes an antenna that transmits the radio signal having directivity toward a floor.

12 Claims, 23 Drawing Sheets

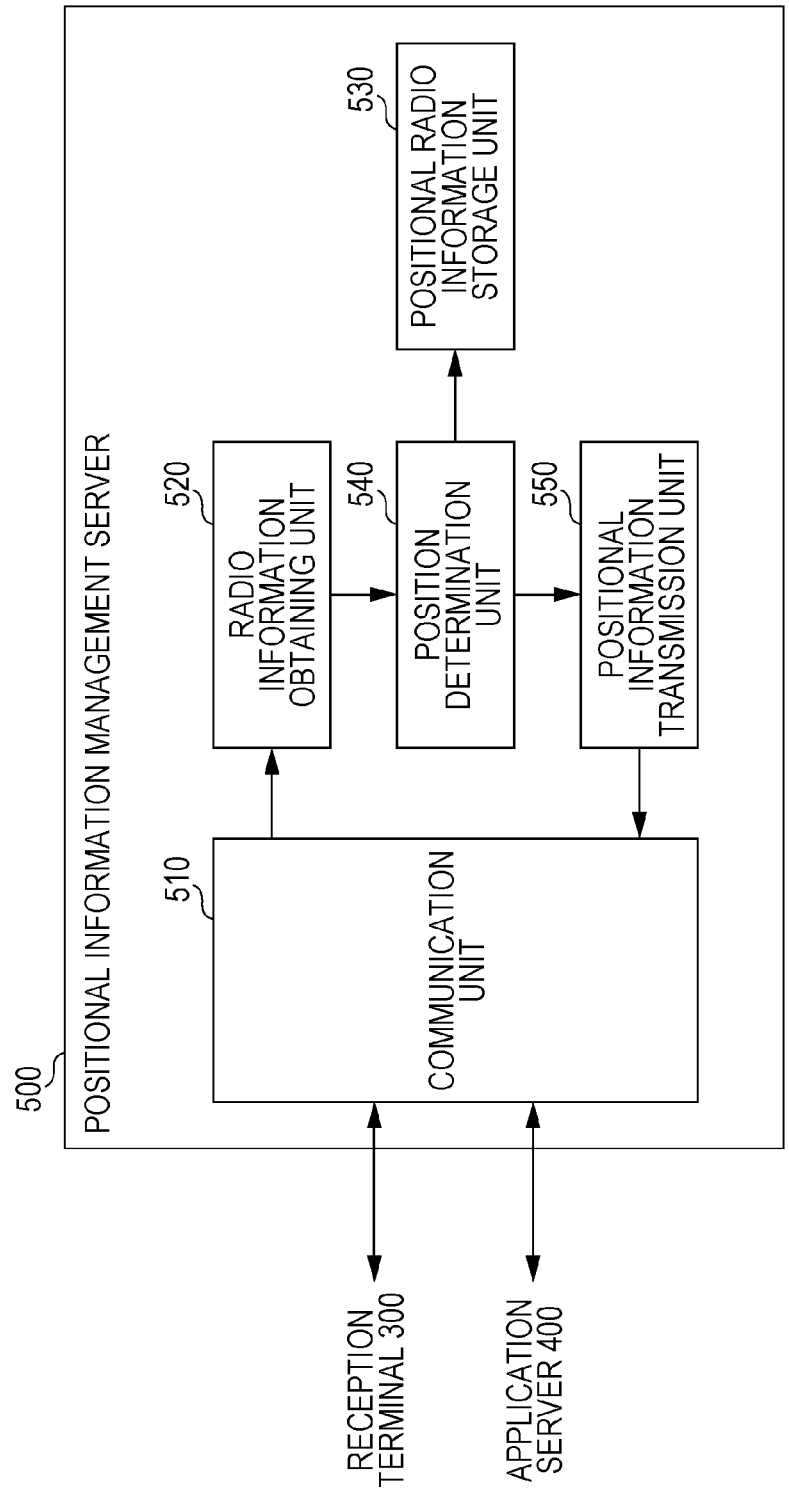

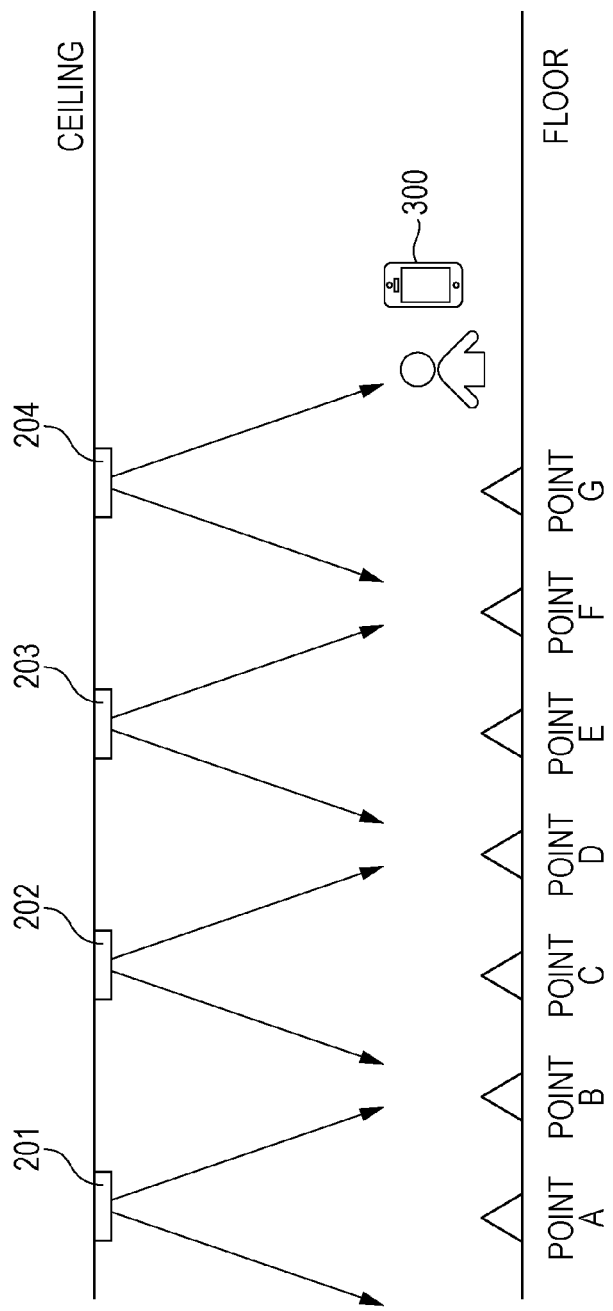

FIG. 18 ↙1500

| RADIO APPARATUS | 201 | 202 | 203 | 204 |
|---|---|---|---|---|
| POINT A | −60 | −80 | −75 | −81 |
| POINT B | −70 | −71 | −84 | −79 |
| POINT C | −78 | −61 | −75 | −90 |
| POINT D | −78 | −68 | −67 | −77 |
| POINT E | −81 | −87 | −63 | −79 |
| POINT F | −82 | −84 | −73 | −65 |
| POINT G | −87 | −87 | −83 | −61 |

FIG. 19 ↙1600

| RADIO APPARATUS | 201 | 202 | 203 | 204 |
|---|---|---|---|---|
| POINT X | −79 | −62 | −74 | −91 |

METHOD FOR MEASURING POSITION, NON-TRANSITORY RECORDING MEDIUM STORING POSITION MEASUREMENT PROGRAM, AND RADIO APPARATUS

BACKGROUND

1. Technical Field

The present disclosure relates to a method for measuring a position, a non-transitory recording medium storing a position measurement program, and a radio apparatus for measuring a current position in indoor space, underground space, a place surrounded by tall buildings, and the like where Global Positioning System (GPS) signals are difficult to detect.

2. Description of the Related Art

Currently, a position measurement system adopting a GPS is used. The position measurement system is a system that receives signals from a plurality of GPS satellites in outer space with a GPS receiver and that identifies the current position of the GPS receiver on the basis of the received signals. If the GPS receiver is covered from above, it is difficult for the GPS receiver to receive signals. Therefore, it is difficult for the GPS receiver to measure the current position thereof using signals from the GPS satellites in a place where the GPS signals are difficult to detect, such as indoor space or underground space. In addition, even in outdoor environments, if there is an obstacle near the GPS receiver, such as a tall building, the GPS receiver might not be able to measure the current position thereof correctly, because the GPS receiver might hide behind the obstacle or receive an incorrect GPS signal reflected from the obstacle.

Furthermore, position measurement systems in the related art adopt an indoor GPS, such as an indoor messaging system (IMES), or Wi-Fi (registered trademark) routers. Such position measurement systems are described in, for example, Japanese Unexamined Patent Application Publication No. 2007-278756 and Japanese Unexamined Patent Application Publication No. 2010-159980. Since smartphones are now widely used, Wi-Fi routers are installed in indoor space or underground space so that a communication function of the smartphones can be used in the indoor space or the underground space. Each smartphone is capable of estimating distances between a Wi-Fi receiver incorporated thereinto and the plurality of Wi-Fi routers and determining the current position thereof using information regarding the distances between the Wi-Fi receiver and the plurality of Wi-Fi routers.

SUMMARY

In the configuration adopting the GPS in the related art, however, it is difficult to measure a position correctly in a place where GPS signals are difficult to detect, such as indoor space, underground space, or a space near a tall building.

One non-limiting and exemplary embodiment provides a method for measuring a position, a non-transitory recording medium storing a position measurement program, and a radio apparatus capable of improving an accuracy of measuring a current position even in a place where GPS signals are difficult to detect.

In one general aspect, the techniques disclosed here feature a method for measuring a position. The method includes the steps of transmitting, using a radio apparatus, a radio signal including identification information for identifying the radio apparatus, receiving, using a reception apparatus, the radio signal transmitted in the step of transmitting, obtaining radio information in which the identification information included in the radio signal received in the step of receiving and radio field intensity of the radio signal are associated with each other, and determining a position of the reception apparatus using the radio information obtained in the step of obtaining. The radio apparatus includes an antenna that transmits the radio signal having directivity toward floor.

According to the present disclosure, the accuracy of measuring a current position can be improved even in a place where GPS signals are difficult to detect.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 16 is a diagram illustrating the detailed configuration of a positional information management server;

FIG. 17 is a diagram illustrating an example of a positional relationship between radio apparatuses and points at a time when positional radio information stored in a positional radio information storage unit has been obtained;

FIG. 18 is a diagram illustrating an example of the positional radio information stored in the positional radio information storage unit;

FIG. 19 is a diagram illustrating an example of radio information received by the reception terminal at a certain point;

DETAILED DESCRIPTION

Figure 1:
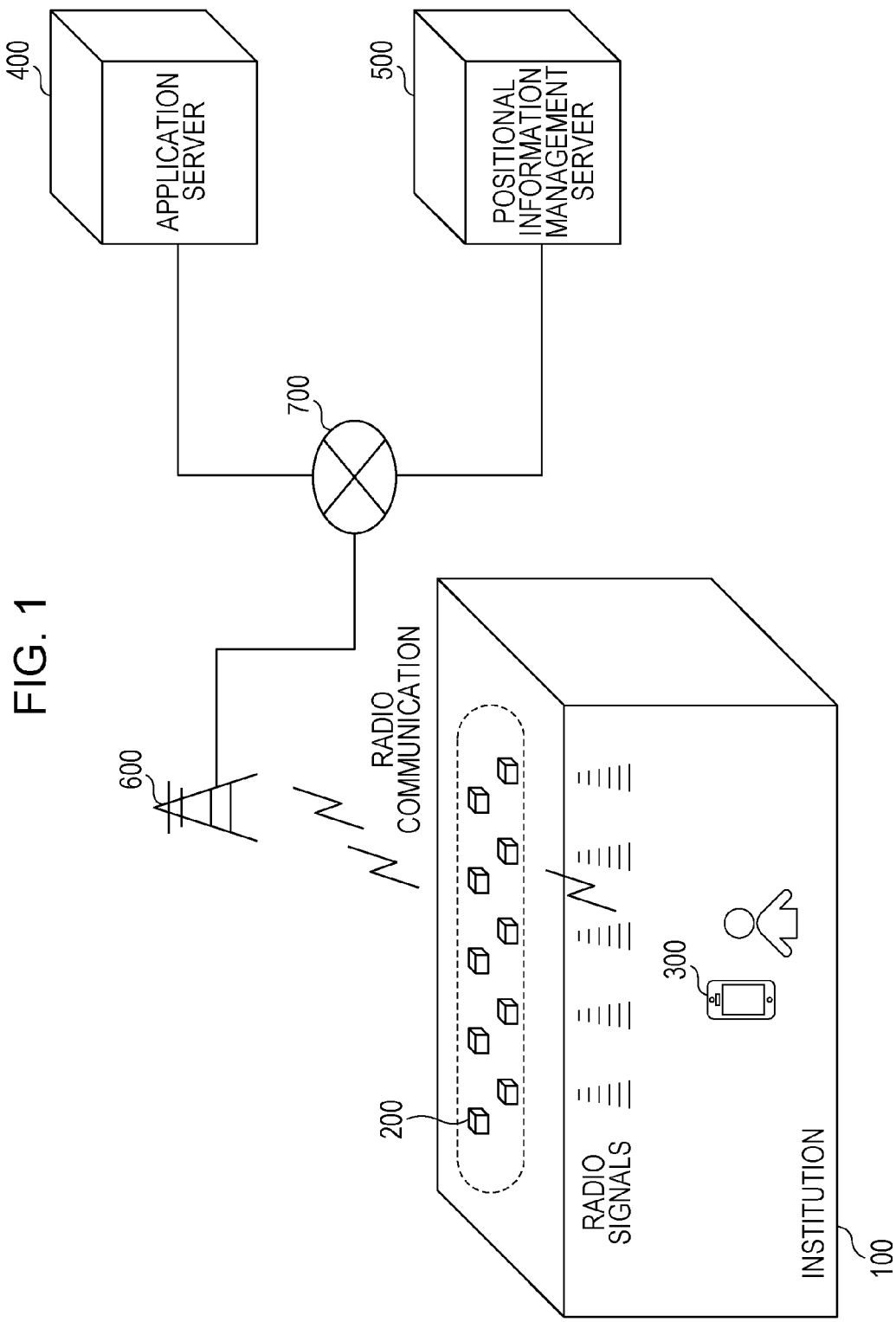
FIG. 1 is a diagram illustrating the overall configuration of a position measurement system according to an embodiment of the present disclosure.

Underlying Knowledge Forming Basis of the Present Disclosure

First, underlying knowledge forming the basis of the present disclosure will be described.

In the configuration adopting the GPS in the example of the related art, it is difficult to measure a position accurately in a place where GPS signals are difficult to detect, such as indoor space, underground space, or a place near a tall building.

In addition, in the measurement adopting an indoor GPS such as an IMES, an accuracy of measuring a position is low, and therefore an incorrect place might be identified as a current position.

In addition, in order to increase the accuracy of measuring a position in the position measurement adopting Wi-Fi routers installed indoors, many Wi-Fi routers need to be installed. Because the Wi-Fi routers need power supplies and work for connecting the Wi-Fi routers to the power supplies, costs undesirably increase. In addition, if, in order to measure a position, additional Wi-Fi routers are installed in addition to Wi-Fi routers necessary for communication performed by Wi-Fi receivers such as smartphones, those who pay the costs, such as landowners, might not permit the installation of the additional Wi-Fi routers. As a result, the number of Wi-Fi routers installed remains small, keeping the accuracy of measuring a position low.

On the basis of the above examination, the present inventors have arrived at aspects of the present disclosure.

A method for measuring a position according to an aspect of the present disclosure includes the steps of transmitting, using a radio apparatus, a radio signal including identification information for identifying the radio apparatus, receiving, using a reception apparatus, the radio signal transmitted in the step of transmitting, obtaining radio information in which the identification information included in the radio signal received in the step of receiving and radio field intensity of the radio signal are associated with each other, and determining a position of the reception apparatus using the radio information obtained in the step of obtaining. The radio apparatus includes an antenna that transmits the radio signal having directivity toward floor.

According to this configuration, the radio apparatus transmits the radio signal including the identification information for identifying the radio apparatus. The reception apparatus receives the transmitted radio signal. The radio information in which the identification information included in the received radio signal and the radio field intensity of the radio signal are associated with each other is obtained, and the position of the reception apparatus is determined using the obtained radio information. The antenna included in the radio apparatus transmits the radio signal having the directivity toward the floor.

Therefore, since the radio information in which the identification information included in the received radio signal and the radio field intensity of the radio signal are associated with each other is obtained and the position of the reception apparatus is determined using the obtained radio information, the accuracy of measuring a current position can be improved even in a place where GPS signals are difficult to detect.

In addition, in the method for measuring a position, for example, the antenna may include a planar substrate, a power feeding device that is formed on an output surface of the substrate, from which the radio signal is output, and a metal film that is formed on a surface of the substrate opposite the output surface and that reflects the radio signal.

According to this configuration, since the radio signal is reflected by the metal film toward the output surface, the directivity of the radio signal can be increased.

In addition, in the method for measuring a position, for example, the power feeding device may include four power feeding devices arranged at corners of a rectangle.

According to this configuration, the four power feeding devices arranged at the corners of the rectangle can increase the directivity.

In addition, in the method for measuring a position, for example, the substrate may be rectangular. The power feeding device may include four power feeding devices formed near corners of the substrate.

According to this configuration, the four power feeding devices formed near the corners of the substrate can increase the directivity.

In addition, in the method for measuring a position, for example, the antenna may be formed along periphery of the substrate and further include a peripheral wall that reflects the output radio signal.

According to this configuration, since the peripheral wall formed along the periphery of the substrate reflects the output radio signal, directivity in a direction perpendicular to the output surface can be increased.

In addition, in the method for measuring a position, for example, the power feeding device may include a plurality of power feeding devices. The antenna may be formed between the plurality of power feeding devices and further include an inner wall that reflects the output radio signal.

According to this configuration, since the inner wall formed between the plurality of power feeding devices reflect the output radio signal, the directivity in the direction perpendicular to the output surface can be increased.

In addition, in the method for measuring a position, for example, the radio apparatus may include a plurality of radio apparatuses. In the step of determining, a table in which each of a plurality of points and radio field intensities of radio signals output from the plurality of radio apparatuses at each of the plurality of points are associated with each other in advance may be referred to, and the position of the reception apparatus may be determined on the basis of radio field intensities of a plurality of radio apparatuses identified by the identification information included in the radio information obtained in the step of obtaining and the radio field intensities of the plurality of radio apparatuses at each of the plurality of points read from the table.

According to this configuration, the table in which each of the plurality of points and the radio field intensities of the radio signals output from the plurality of radio apparatuses at each of the plurality of points are associated with each other in advance is referred to, and the position of the reception apparatus is determined on the basis of the radio field intensities of the plurality of radio apparatuses identified by the identification information included in the obtained radio information and the radio field intensities of the plurality of radio apparatuses at each of the plurality of points read from the table.

Therefore, the position of the reception apparatus can be easily determined by using the table in which each of the plurality of points and the radio field intensities of the radio signals output from the plurality of radio apparatuses at each of the plurality of points are associated with each other in advance.

In addition, in the method for measuring a position, for example, in the step of determining, absolute values of differences between the radio field intensities of the plurality of radio apparatuses identified by the identification information included in the radio information obtained in the step of obtaining and the radio field intensities of the plurality of radio apparatuses at each of the plurality of points read from the table may be summed, and a point at which a smallest sum is obtained may be determined as the position of the reception apparatus.

According to this configuration, the absolute values of the differences between the radio field intensities of the plurality of radio apparatuses identified by the identification information included in the obtained radio information and the radio field intensities of the plurality of radio apparatuses at each of the plurality of points read from the table are summed, and the point at which the smallest sum is obtained is determined as the position of the reception apparatus. Therefore, the position of the reception apparatus can be determined through simple calculations.

In addition, in the method for measuring a position, for example, in the step of transmitting, the radio apparatus may transmit a plurality of radio signals including different pieces of identification information with different radio field intensities.

According to this configuration, the radio apparatus transmits the plurality of radio signals including different pieces of identification information with different radio field intensities. Therefore, if the reception apparatus is located near the radio apparatus, the position is determined using a radio signal whose radio field intensity is low and, if the reception apparatus is located at a distance from the radio apparatus, the position is determined using a radio signal whose radio field intensity is high. Accordingly, radio signals can be detected within a wider range, thereby increasing the accuracy of determining the position of the reception apparatus.

In addition, in the method for measuring a position, for example, if the radio apparatus is located near a block that blocks the radio signal, the radio apparatus may decrease the radio field intensity in the step of transmitting.

According to this configuration, if the radio apparatus is located near a block that blocks the radio signal, the radio apparatus can decrease the radio field intensity. Therefore, amplification of radio field intensity caused when the block reflects the radio signal can be suppressed, thereby increasing the accuracy of determining the position of the reception apparatus.

In addition, in the method for measuring a position, for example, in the step of transmitting, the radio apparatus may transmit the radio signal with a radio field intensity according to a distance between a position at which the radio apparatus is arranged and a floor.

According to this configuration, since the radio signal is transmitted with a radio field intensity according to the distance between the position at which the radio apparatus is arranged and the floor, for example, radio field intensities of radio signals from radio apparatuses near the floor can be the same, thereby increasing the accuracy of determining the position of the reception apparatus.

In addition, in the method for measuring a position, for example, if the radio apparatus is located near a block that blocks the radio signal, the radio apparatus may transmit, in the step of transmitting, the radio signal in a direction opposite a direction in which the block exists.

According to this configuration, if the radio apparatus is located near a block that blocks the radio signal, the radio apparatus transmits the radio signal in the direction opposite the direction in which the block exists. Therefore, amplification of radio field intensity caused when the block reflects the radio signal can be suppressed, thereby increasing the accuracy of determining the position of the reception apparatus.

A non-transitory recording medium according to another aspect of the present disclosure is a computer-readable non-transitory recording medium storing a position measurement program. The position measurement program causes a computer to perform a process including obtaining radio information in which identification information for identifying a radio apparatus included in a radio signal received from the radio apparatus and radio field intensity of the radio signal are associated with each other, and determining a position of a reception apparatus using the obtained radio information. The radio apparatus includes an antenna that transmits the radio signal having directivity toward floor.

According to this configuration, the radio information in which the identification information for identifying the radio apparatus included in the radio signal received from the radio apparatus and the radio field intensity of the radio signal are associated with each other is obtained. The position of the reception apparatus is determined using the obtained radio information. The antenna included in the radio apparatus transmits the radio signal having the directivity toward the floor.

Therefore, since the radio information in which the identification information included in the received radio signal and the radio field intensity of the radio signal are associated with each other is obtained and the position of the reception apparatus is determined using the obtained radio information, the accuracy of measuring a current position can be improved even in a place where GPS signals are difficult to detect.

A radio apparatus according to another aspect of the present disclosure includes a storage that stores identification information for identifying a radio apparatus, and a radio signal transmitter that transmits a radio signal including the identification information with a certain radio field intensity. The radio signal transmitter includes an antenna that transmits the radio signal having directivity toward a floor.

According to this configuration, the storage stores the identification information for identifying the radio apparatus. The radio signal including the identification information is transmitted with the certain radio field intensity. The antenna included in the radio signal transmitter transmits the radio signal having the directivity toward the floor.

Therefore, since the position of the reception apparatus is determined using the radio information in which the identification information included in the radio signal and the radio field intensity of the radio signal are associated with each other, the accuracy of measuring a current position can be improved even in a place where GPS signals are difficult to detect.

An embodiment of the present disclosure will be described with reference to the drawings. It is to be noted that the following embodiment is a specific example of the present disclosure, and is not intended to limit the technical scope of the present disclosure.

Overall Configuration

FIG. 1 is a diagram illustrating the overall configuration of a position measurement system according to the embodiment of the present disclosure. The position measurement system includes a plurality of radio apparatuses 200, a reception terminal 300, an application server 400, a positional information management server 500, and a mobile phone base station 600.

The radio apparatuses 200 are installed in an institution 100. The institution 100 is, for example, an underground mall or a building. Each radio apparatus 200 transmits a radio signal to the reception terminal 300. The reception terminal 300 transmits information relating to the received radio signal to the positional information management server 500 through the mobile phone base station 600 and an Internet 700.

The positional information management server 500 transmits positional information indicating a current position of the reception terminal 300 to the reception terminal 300 through the Internet 700 and the mobile phone base station 600. The reception terminal 300 is, for example, a smartphone. An application for smartphones operates on the reception terminal 300 and cooperates with the application server 400. In this case, the positional information management server 500 may transmit the positional information to the application server 400. Furthermore, the reception terminal 300 transmits the positional information to the application server 400 through the mobile phone base station 600 and the Internet 700. The application server 400 transmits additional information to the reception terminal 300 in accordance with the received positional information, and the reception terminal 300 outputs the additional information to a monitor or the like.

Alternatively, the reception terminal 300 may be, for example, a tablet computer, a mobile phone, or a laptop personal computer (PC).

Detailed Configuration of Institution 100

The specific configuration of the institution 100 is not illustrated in the drawings. The institution 100 is where the radio apparatuses 200 are installed.

Detailed Configuration of Radio Apparatus 200

Figure 2:
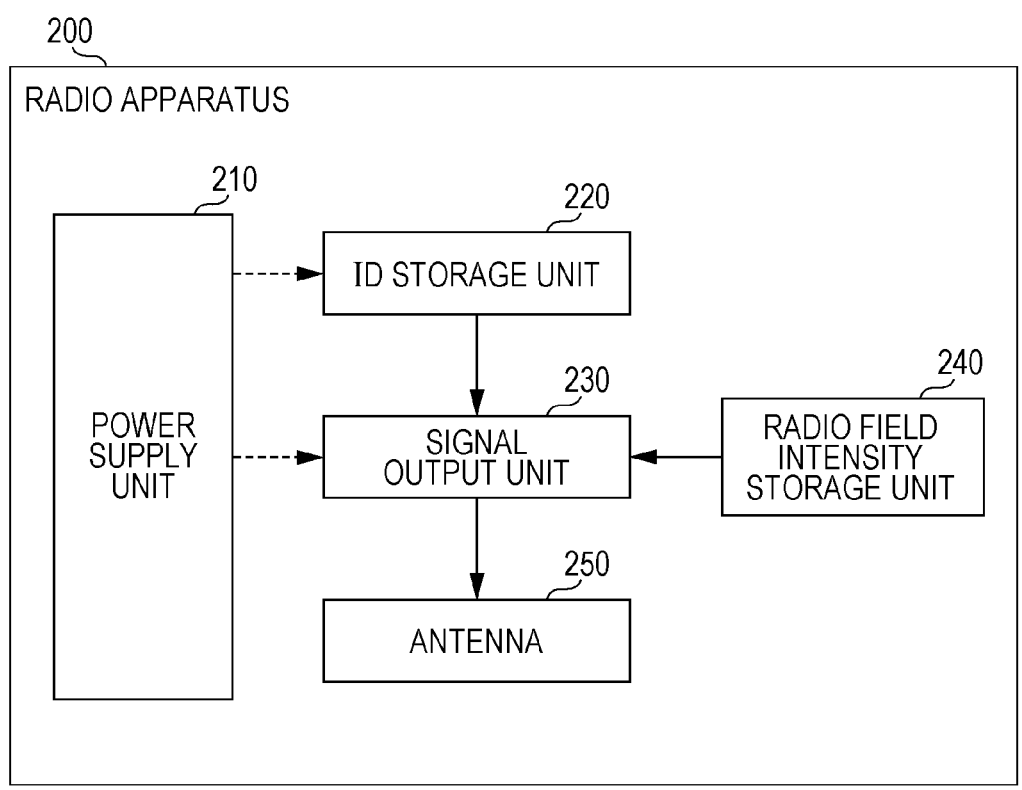
FIG. 2 is a diagram illustrating the detailed configuration of a radio apparatus.

FIG. 2 is a diagram illustrating the detailed configuration of each radio apparatus 200.

As illustrated in FIG. 2, the radio apparatus 200 includes a power supply unit 210, an identifier (ID) storage unit 220, a signal output unit 230, a radio field intensity storage unit 240, and an antenna 250.

The power supply unit 210 is a power supply for operating the components of the radio apparatus 200. For example, the power supply unit 210 may be configured to be connected to an external power supply and receive power from the external power supply. If the external power supply supplies power to the power supply unit 210, however, connection work is necessary to install each radio apparatus 200 in the institution 100. Therefore, if many radio apparatuses 200 are installed, costs soar. For this reason, the power supply unit 210 is preferably an independent power supply, which does not require connection work. The independent power supply may be, for example, a primary battery or a combination of a power generation device such as a photovoltaic device and an electrical storage device that stores generated power. The power generation device may be a wind power generation device, a vibration power generation device, or the like, instead of the photovoltaic device.

The ID storage unit 220 stores an ID (identification information) for identifying the radio apparatus 200.

The signal output unit 230 transmits radio signal power to the antenna 250 in order to transmit a radio signal including the ID stored in the ID storage unit 220 from the antenna 250.

The radio field intensity storage unit 240 stores the radio field intensity of a radio signal transmitted from the antenna 250. The signal output unit 230 transmits, to the antenna 250, radio signal power adjusted in accordance with the radio field intensity stored in the radio field intensity storage unit 240.

The antenna 250 transmits a radio signal including the ID stored in the ID storage unit 220 using the transmitted radio signal power. The antenna 250 transmits a radio signal having directivity toward a floor. For example, if a radio apparatus 200 is provided on a ceiling, the antenna 250 transmits a radio signal having downward directivity. On the other hand, for example, if a radio apparatus 200 is provided on a wall, the antenna 250 transmits a radio signal having obliquely downward directivity. The floor need not be a floor inside the institution 100 but may be an outdoor surface ground surrounded by buildings.

The radio apparatus 200 need not communicate with the reception terminal 300 in a bidirectional manner like a Wi-Fi router but may be configured to transmit a radio signal to the reception terminal 300 in a unidirectional manner. In this case, because the radio apparatus 200 can transmit a radio signal without consuming standby current for receiving a radio signal from the reception terminal 300, power consumption can be significantly reduced. In addition, since the radio apparatus 200 includes the independent power supply such as a battery or a power generation device and need not be connected to a power supply, work for connecting the radio apparatus 200 to a power supply is not necessary. Therefore, a cost-efficient infrastructure can be realized.

Detailed Configuration of Antenna 250

Figure 3:
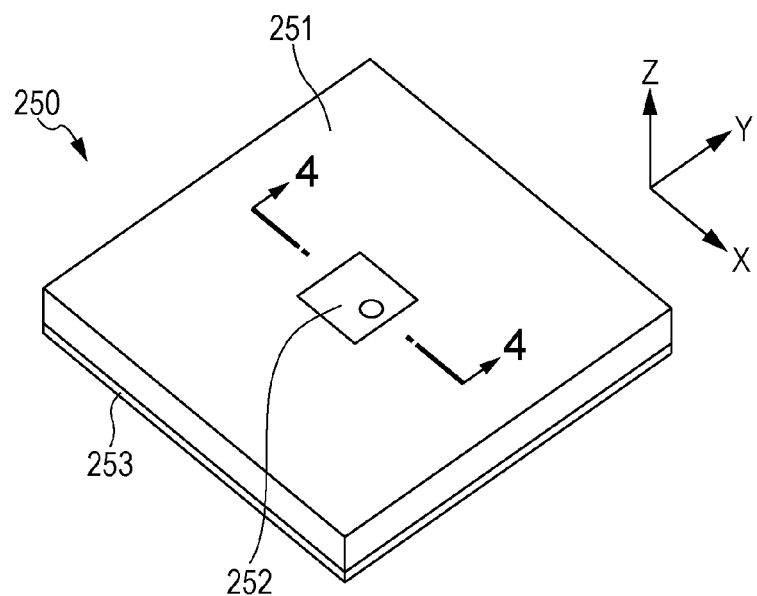
FIG. 3 is a diagram illustrating the appearance of an antenna.
Figure 4:
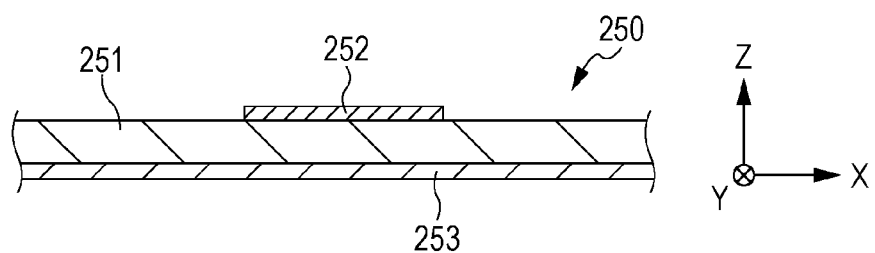
FIG. 4 is a cross-sectional view of the antenna illustrated in FIG. 3 taken along line 4-4.

FIG. 3 is a diagram illustrating the appearance of the antenna 250. FIG. 4 is a cross-sectional view of the antenna 250 illustrated in FIG. 3 taken along line 4-4. The antenna 250 includes a planar substrate 251, a power feeding device 252 formed on an output surface, from which a radio signal is output, of the substrate 251, and a metal film 253, which is formed on a surface of the substrate 251 opposite the output surface, that reflects radio signals. The antenna 250 outputs a radio signal in a Z-axis direction. Here, the substrate 251 is square. The power feeding device 252 is, for example, rectangular and formed at the center of the substrate 251. The power feeding device 252 supplies power to the antenna 250.

The metal film 253 is preferably formed over the entirety of the surface of the substrate 251 opposite the output surface.

Because the metal film 253 reflects radio waves transmitted in a −Z direction and the reflected radio waves travel in a +Z direction, gain of radio waves emitted in the +Z direction can be increased, and directivity in the +Z direction can be increased.

Figure 5:
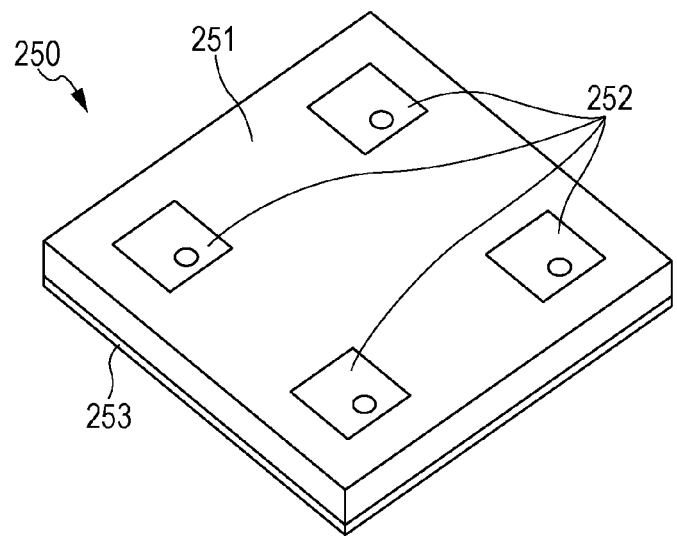
FIG. 5 is a diagram illustrating the appearance of an antenna according to a first modification.

FIG. 5 is a diagram illustrating the appearance of an antenna 250 according to a first modification. As illustrated in FIG. 5, a substrate 251 is square. The antenna 250 includes four power feeding devices 252. The four power feeding devices 252 are formed close to corners of the substrate 251 in a two-by-two matrix.

Furthermore, four signals whose phases are shifted by half a wavelength or a quarter of the wavelength are generated and input to the four power feeding devices 252, respectively. In doing so, radio wave components of four radio signals output from the four power feeding devices 252 that travel through the air in the +Z direction resonate with one another, thereby increasing gain thereof. On the other hand, radio wave components that travel through the air in directions deviated from the +Z direction cancel one another, thereby decreasing gain thereof. As a result, higher gain is obtained in the +Z direction, and radio waveforms have directivity in the +Z direction. Because of this configuration, when the antenna 250 is used, the antenna 250 can transmit sufficient radio signals in the +Z direction even if power used for transmitting the radio signals is decreased. Therefore, an effect of reducing power consumption can be produced.

The substrate 251 need not be square. The power feeding devices 252 may be configured by four power feeding devices provided at the four corners of the square.

Figure 6:
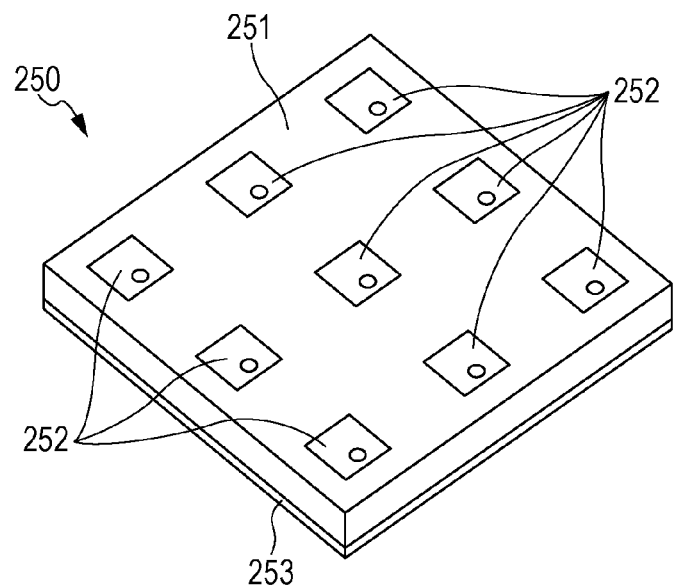
FIG. 6 is a diagram illustrating the appearance of an antenna according to a second modification.

FIG. 6 is a diagram illustrating the appearance of an antenna 250 according to a second modification. As illustrated in FIG. 6, a substrate 251 is square. The antenna 250 includes nine power feeding devices 252. The nine power feeding devices 252 are formed in a three-by-three matrix.

Figure 7:
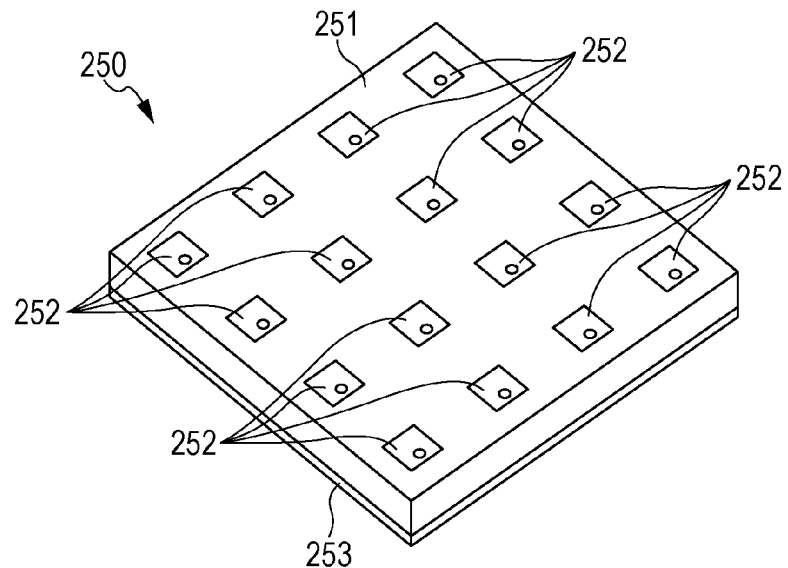
FIG. 7 is a diagram illustrating the appearance of an antenna according to a third modification.

FIG. 7 is a diagram illustrating the appearance of an antenna 250 according to a third modification. As illustrated in FIG. 7, a substrate 251 is square. The antenna 250 includes sixteen power feeding devices 252. The sixteen power feeding devices 252 are formed in a four-by-four matrix.

Although the substrate 251 is square in this embodiment, the present disclosure is not limited to this. The substrate 251 may be rectangular, instead. In addition, the antenna 250 may include six power feeding devices 252, that is, two rows of power feeding devices 252 may be formed in an X direction, and three columns of power feeding devices 252 may be formed in a Y direction.

In this embodiment, the shapes of the substrate 251 and the power feeding devices 252 are not particularly limited. In addition, the number of power feeding devices 252 is not particularly limited.

Figure 8:
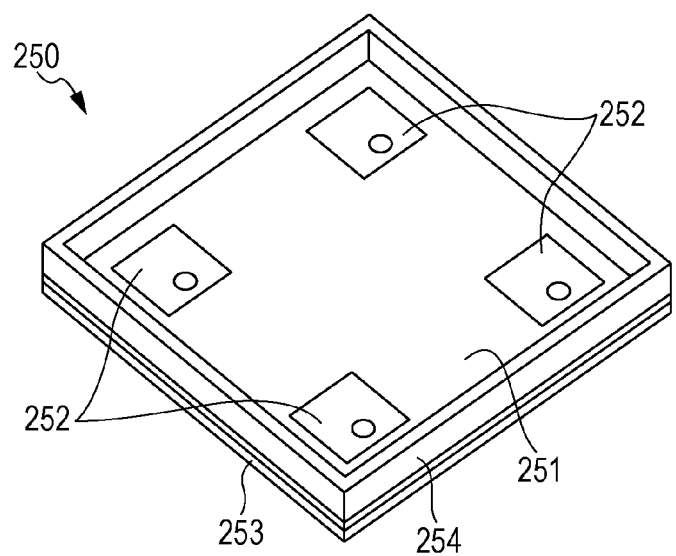
FIG. 8 is a diagram illustrating the appearance of an antenna according to a fourth modification.

FIG. 8 is a diagram illustrating the appearance of an antenna 250 according to a fourth modification. As illustrated in FIG. 8, a substrate 251 is square. The antenna 250 includes four power feeding devices 252. The four power feeding devices 252 are formed close to corners of the substrate 251, respectively, that is, formed in a two-by-two matrix.

The antenna 250 further includes peripheral walls 254 that are formed along the periphery of the substrate 251 and that reflect output radio signals. The peripheral walls 254 reflect and absorb radio waves that travel in the X-axis direction and a Y-axis direction. As a result, gain of radio waves output in the +Z direction can be increased, and the directivity in the +Z direction can be increased.

Figure 9:
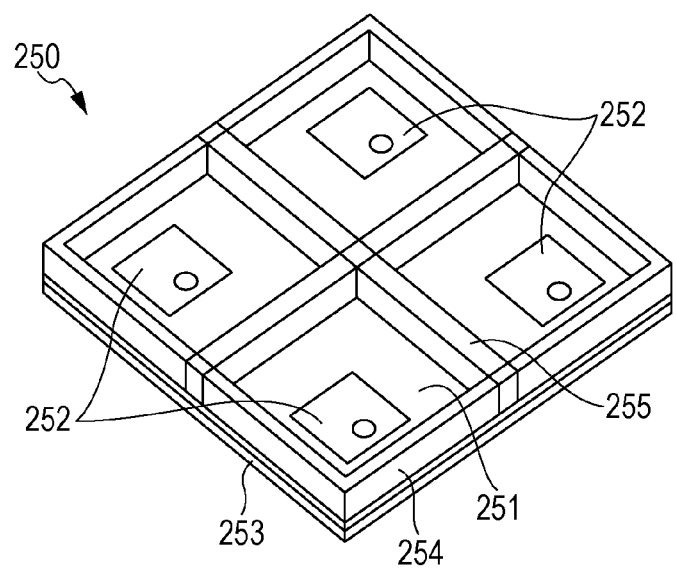
FIG. 9 is a diagram illustrating the appearance of an antenna according to a fifth modification.

FIG. 9 is a diagram illustrating the appearance of an antenna 250 according to fifth modification. As illustrated in FIG. 9, a substrate 251 is square. The antenna 250 includes four power feeding devices 252. The four power feeding devices 252 are formed close to corners of the substrate 251, that is, formed in a two-by-two matrix.

The antenna 250 further includes peripheral walls 254 that are formed along the periphery of the substrate 251 and that reflect output radio signals. In addition, the antenna 250 further includes inner walls 255 that are formed between the plurality of power feeding devices 252 and that reflect output radio signals. The inner walls 255 reflect and absorb radio waves that travel in the X-axis direction and the Y-axis direction. As a result, gain of radio waves output in the +Z direction can be further increased, and the directivity in the +Z direction can be further increased.

Detailed Configuration of Reception Terminal 300

Figure 10:
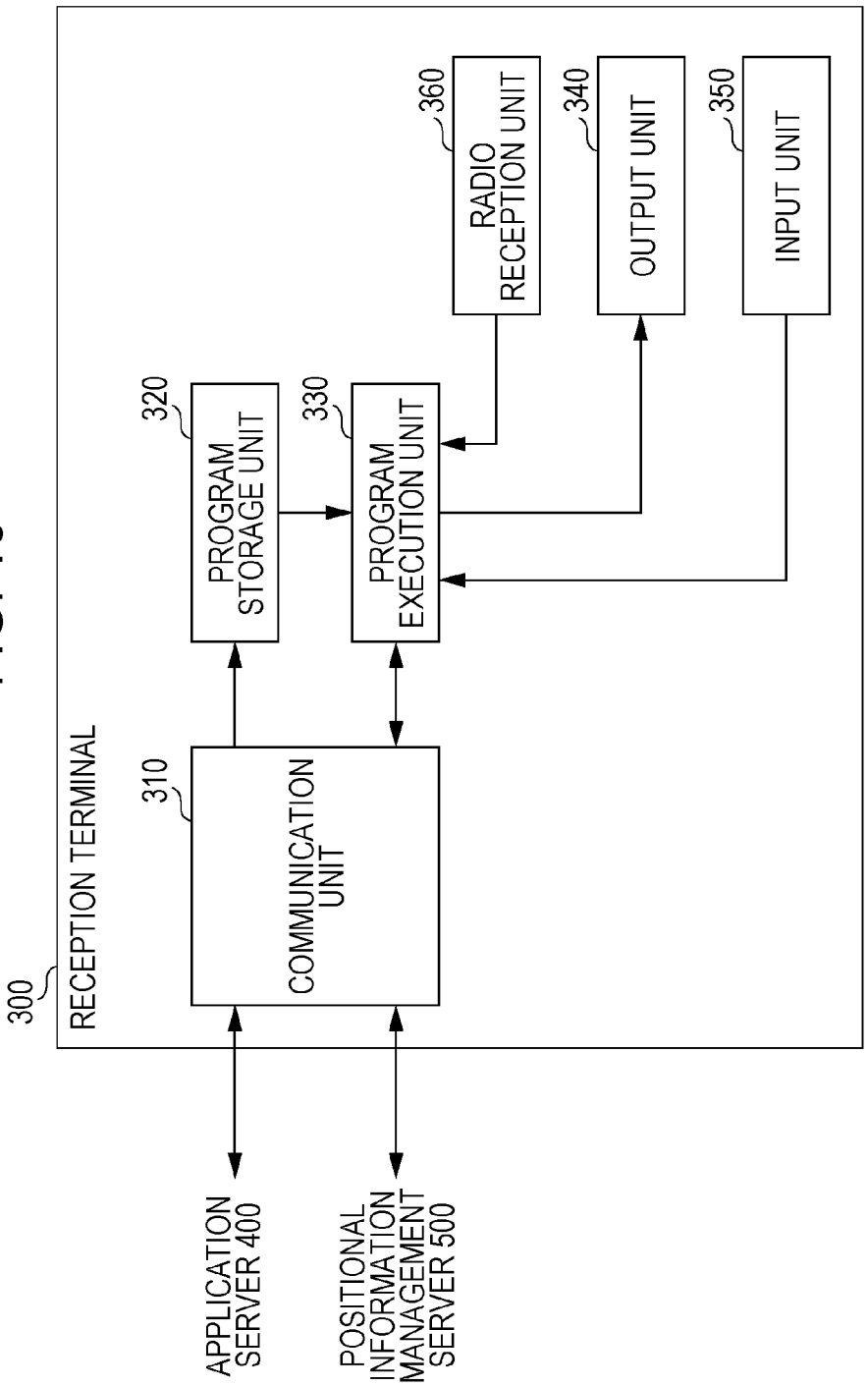
FIG. 10 is a diagram illustrating the detailed configuration of a reception terminal.

FIG. 10 is a diagram illustrating the detailed configuration of the reception terminal 300.

As illustrated in FIG. 10, the reception terminal 300 includes a communication unit 310, a program storage unit 320, a program execution unit 330, an output unit 340, an input unit 350, and a radio reception unit 360.

The communication unit 310 controls communication with the outside. The communication unit 310 communicates with the application server 400 and the positional information management server 500 through the mobile phone base station 600 and the Internet 700.

The communication unit 310 receives a program from a program distribution server and stores the received program in the program storage unit 320. The program storage unit 320 stores the program received by the communication unit 310. The program distribution server provides, for example, a content distribution service that distributes digital content such as an application. The program need not be received from the program distribution server, but may be written to and stored in the program storage unit 320 by a factory apparatus during the manufacture of the reception terminal 300, instead.

The program execution unit 330 executes the program stored in the program storage unit 320. The program execution unit 330 may be, for example, a microcomputer.

The output unit 340 outputs output information to be processed by the program. The output unit 340 includes, for example, a monitor, an audio speaker, a light-emitting diode (LED) lamp, or a memory storing an electronic file.

The input unit 350 obtains input information to be processed by the program. The input unit 350 includes, for example, a touch panel, an audio microphone, a photosensitive sensor, or a camera sensor.

The radio reception unit 360 receives radio signals transmitted from the radio apparatuses 200. The radio reception unit 360 measures the radio field intensities of the received radio signals.

Figure 11:
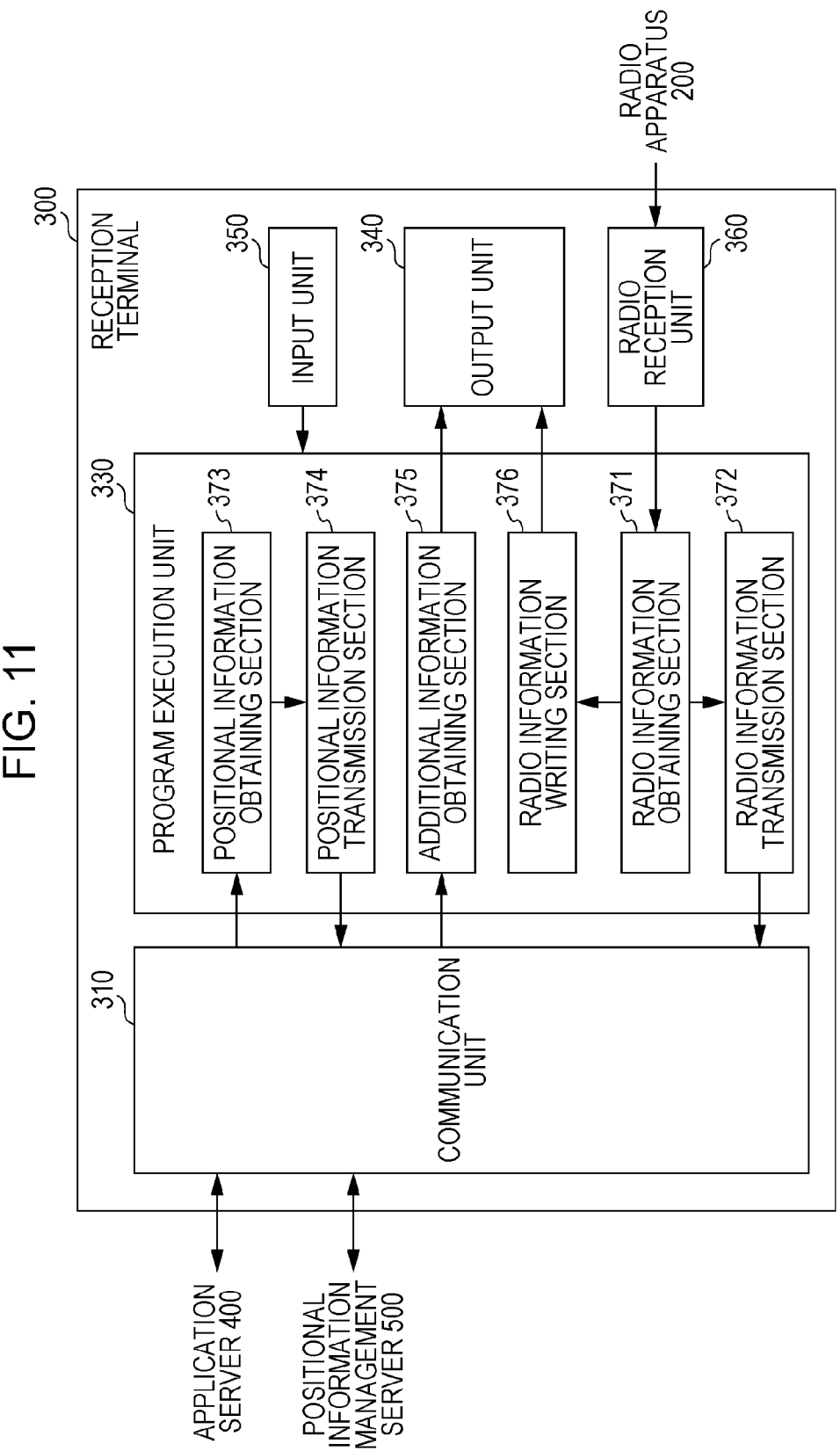
FIG. 11 is a diagram illustrating the detailed configuration of a program execution unit of the reception terminal.

FIG. 11 is a diagram illustrating the detailed configuration of the program execution unit 330 of the reception terminal 300. The program execution unit 330 of the reception terminal 300 executes a program.

As illustrated in FIG. 11, the program execution unit 330 includes a radio information obtaining section 371, a radio information transmission section 372, positional information obtaining section 373, a positional information transmission section 374, an additional information obtaining section 375, and a radio information writing section 376.

The radio information obtaining section 371 obtains radio information from the radio reception unit 360. The radio information is information in which the ID included in a radio signal transmitted from each of the plurality of radio apparatuses 200 and the radio field intensity of the received radio signal are associated with each other. The radio information obtaining section 371 obtains the radio information in which the ID (identification information) included in a radio signal received by the radio reception unit 360 and the radio field intensity of the radio signal are associated with each other. If a radio signal is not received, there is no radio information.

Figure 12:
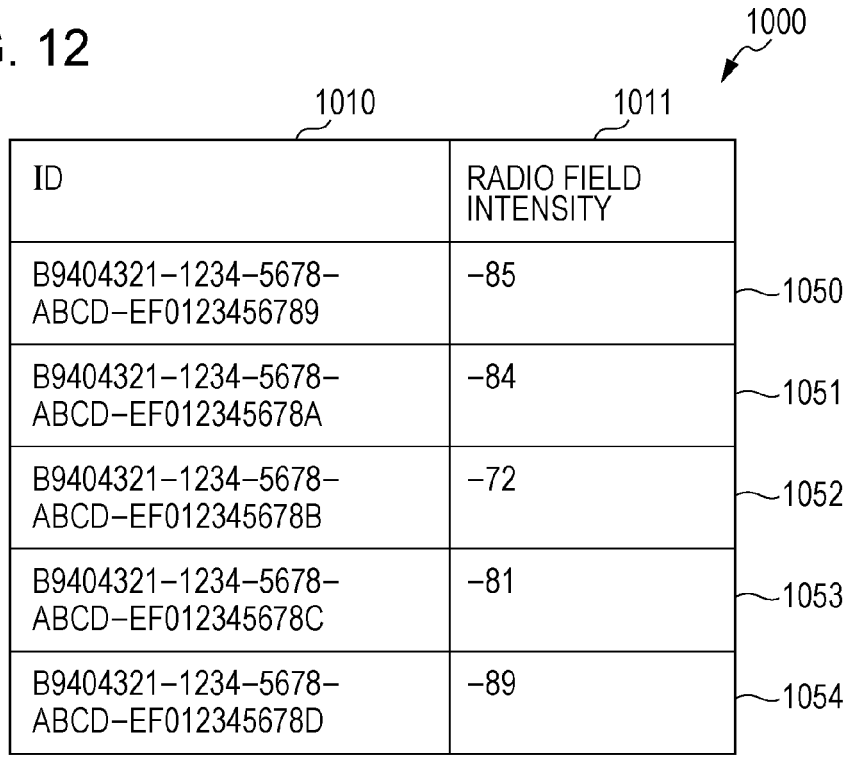
FIG. 12 is a diagram illustrating an example of radio information.

FIG. 12 is a diagram illustrating an example of radio information 1000. A column 1010 indicates IDs, and a column 1011 indicates radio field intensities. A row 1050 indicates that a radio signal whose ID is "B9404321-1234-5678-ABCD-EF0123456789" and whose radio field intensity is "−85" has been received. The radio information 1000 illustrated in FIG. 12 includes five pieces of information in rows 1050, 1051, 1052, 1053, and 1054. Therefore, the radio information 1000 indicates that radio signals have been simultaneously received from five radio apparatuses 200, and the five pieces of information constitute the radio information 1000.

The radio information transmission section 372 transmits the radio information 1000 obtained by the radio information obtaining section 371 to the positional information management server 500 through the communication unit 310. The communication unit 310 transmits the radio information 1000 to the positional information management server 500 through the mobile phone base station 600 and the Internet 700. Alternatively, the communication unit 310 may transmit the radio information 1000 to the positional information management server 500 through a communication device such as a Wi-Fi router and the Internet 700, without using the mobile phone base station 600.

The positional information obtaining section 373 obtains positional information corresponding to the radio information 1000 transmitted by the radio information transmission section 372 from the positional information management server 500 through the communication unit 310. The positional information is information indicating the current position of the reception terminal 300. As in the transmission of the radio information 1000, the communication unit 310 receives the positional information through the Internet 700 and the mobile phone base station 600. Alternatively, the communication unit 310 may receive the positional information through a communication device such as a Wi-Fi router and the Internet 700, without using the mobile phone base station 600.

The positional information transmission section 374 transmits the positional information obtained by the positional information obtaining section 373 to the application server 400 through the communication unit 310. The communication unit 310 transmits the positional information to the application server 400 through the mobile phone base station 600 and the Internet 700. Alternatively, the communication unit 310 may transmit the positional information to the application server 400 through a communication device such as a Wi-Fi router and the Internet 700, without using the mobile phone base station 600.

The additional information obtaining section 375 obtains additional information corresponding to the positional information transmitted by the positional information transmission section 374 from the application server 400 through the communication unit 310. As in the reception of the positional information, the communication unit 310 receives the additional information through the Internet 700 and the mobile phone base station 600. Alternatively, the communication unit 310 may receive the additional information through a communication device such as a Wi-Fi router and the Internet 700, without using the mobile phone base station 600. Furthermore, the additional information obtaining section 375 outputs the obtained additional information to the output unit 340 such as a monitor.

The radio information writing section 376 writes the radio information 1000 obtained by the radio information obtaining section 371 to an electronic file and outputs the electronic file to the output unit 340. For example, the electronic file is an image file. If the reception terminal 300 is a digital camera and does not have a communication function corresponding to the communication unit 310, it is difficult for the reception terminal 300 to receive positional information in real-time. Therefore, the radio information writing section 376 initially writes radio information obtained during capture of an image to an image file.

Figure 13:
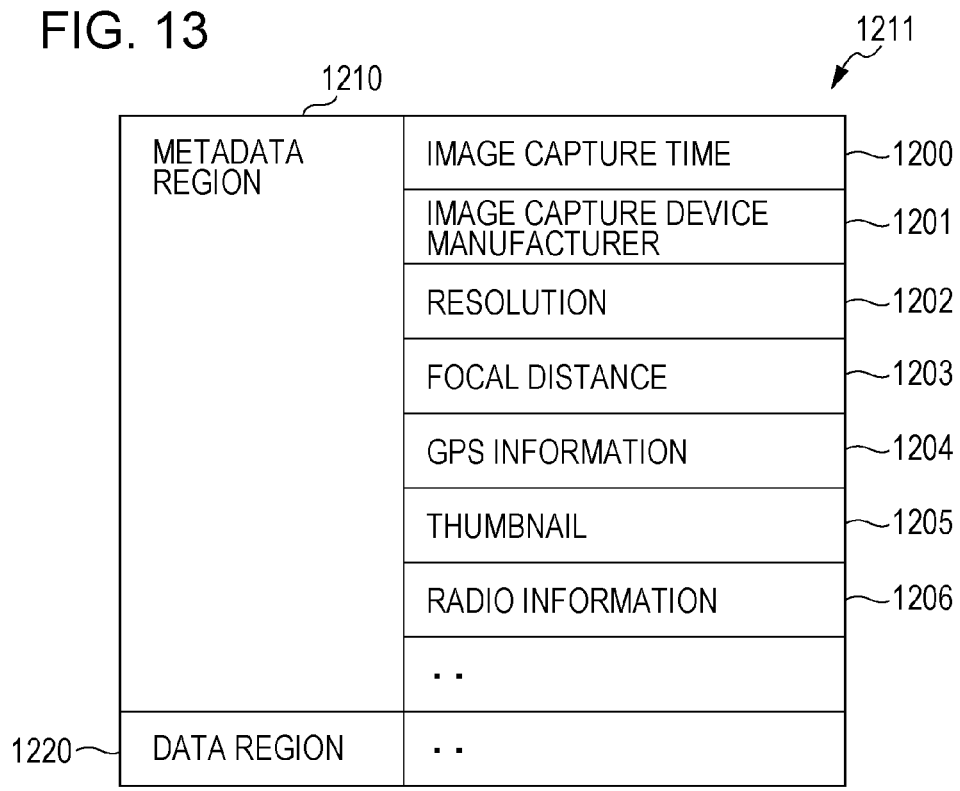
FIG. 13 is a diagram illustrating an example of the internal configuration of an electronic file.

FIG. 13 is a diagram illustrating an example of the internal structure of an electronic file 1211. The electronic file 1211 includes a metadata region 1210 and a data region 1220. In the data region 1220, for example, a main part of the electronic file 1211, such as pixel information regarding photograph data, is recorded. On the other hand, in the metadata region 1210, information relating to the electronic file 1211 is recorded. For example, if the electronic file 1211 is an image file, the metadata region 1210 includes an image capture time 1200, an image capture device manufacturer 1201, resolution 1202, a focal distance 1203, GPS information 1204, a thumbnail 1205, and radio information 1206.

Since it is difficult to perform position measurement adopting a GPS function in a place where GPS signals are difficult to detect, information is not recorded as the GPS information 1204. The reception terminal 300 according to this embodiment is capable of obtaining positional information, converting the obtained positional information into GPS information, and recording the GPS information as the GPS information 1204. Even if radio information is obtained, however, it is difficult for a common digital camera, which does not have a communication function at a mobile phone or the like, to transmit the radio information to the positional information management server 500. As a result, it is difficult for the common digital camera to receive positional information from the positional information management server 500.

Therefore, the radio information writing section 376 writes obtained radio information 1206 to the metadata region 1210 of the electronic file 1211. If, for example, the digital camera is connected to a PC that can be connected to the Internet 700, the PC obtains the electronic file 1211 and transmits the radio information 1206 included in the electronic file 1211 to the positional information management server 500, in order to obtain positional information.

Figure 14:
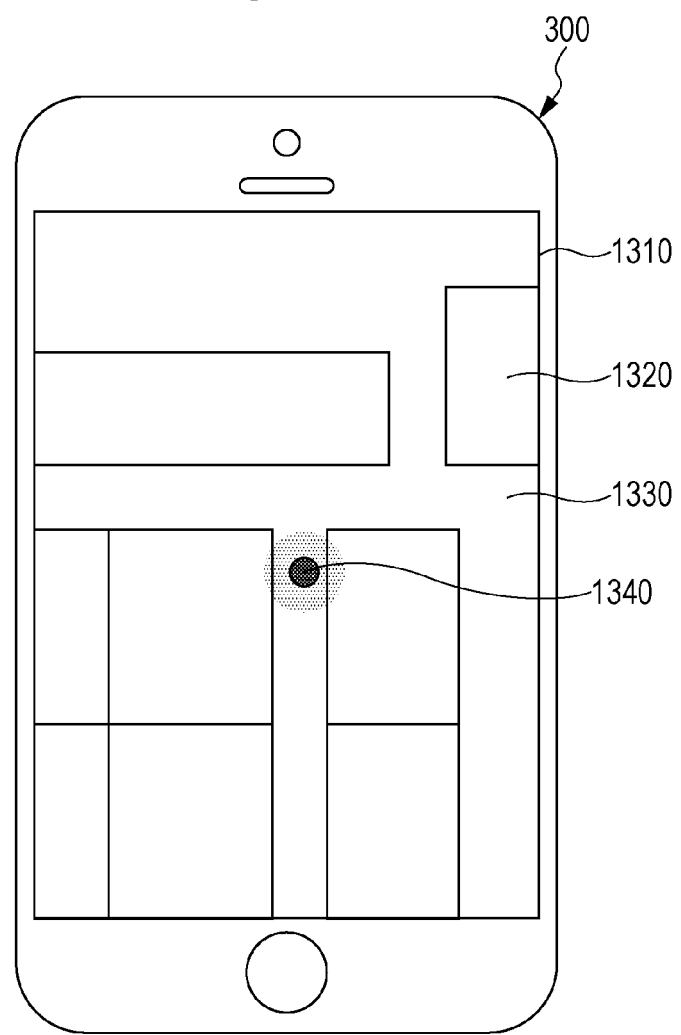
FIG. 14 is a diagram illustrating an example of a screen displayed on a monitor of the reception terminal.

FIG. 14 is a diagram illustrating an example of a screen displayed on the monitor of the reception terminal 300. The screen illustrated in FIG. 14 displays an indoor map and a current position determined on the basis received positional information. The indoor map is provided as additional information.

A monitor unit 1310 of the reception terminal 300 displays, in the indoor map, a shop area 1320, a passage area 1330, and an icon 1340 indicating the current position of the reception terminal 300.

Detailed Configuration of Application Server 400

Figure 15:
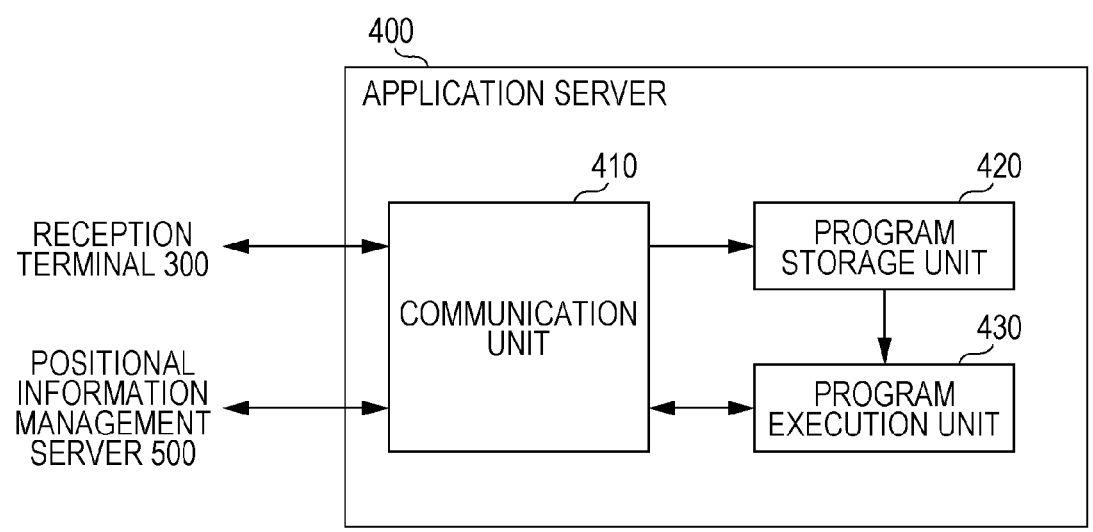
FIG. 15 is a diagram illustrating the detailed configuration of an application server.

FIG. 15 is a diagram illustrating the detailed configuration of the application server 400.

As illustrated in FIG. 15, the application server 400 includes a communication unit 410, a program storage unit 420, and a program execution unit 430.

The communication unit 410 controls communication with the outside. The communication unit 410 communicates with the reception terminal 300 through the mobile phone base station 600 and the Internet 700. The communication unit 410 also communicates with the positional information management server 500 through the Internet 700.

The program storage unit 420 stores a program to be executed by the program execution unit 430.

The program execution unit 430 executes the program stored in the program storage unit 420. The program execution unit 430 obtains positional information transmitted from the reception terminal 300 through the communication unit 410. The program execution unit 430 determines additional information corresponding to the obtained positional information and transmits the determined additional information to the additional information obtaining section 375 of the reception terminal 300 through the communication unit 410.

For example, the program execution unit 430 transmits map information regarding indoor space or the like limited to a range corresponding to the positional information to the reception terminal 300 as additional information. The reception terminal 300 can display a current position to the user in an easy-to-understand manner by outputting the received map information and the current position identified by the positional information. FIG. 14 illustrates an example of displayed interfaces.

A map of indoor space or the like is an example of the additional information. Various types of additional information are possible depending on a service provided by the application server 400, but because specific types of additional information are not directly related to the scope of the present disclosure, description of variations and detailed configurations of the additional information is omitted.

Detailed Configuration of Positional Information Management Server 500

FIG. 16 is a diagram illustrating the detailed configuration of the positional information management server 500.

As illustrated in FIG. 16, the positional information management server 500 includes a communication unit 510, a radio information obtaining unit 520, a positional radio information storage unit 530, a position determination unit 540, and a positional information transmission unit 550.

The communication unit 510 controls communication with the outside. The communication unit 510 communicates with the reception terminal 300 through the mobile phone base station 600 and the Internet 700. The communication unit 510 also communicates with the application server 400 through the Internet 700.

The radio information obtaining unit 520 obtains radio information transmitted from the reception terminal 300 through the communication unit 510.

The positional radio information storage unit 530 stores in advance positional radio information indicating a correspondence relationship between positions and the radio field intensity of each radio apparatus 200.

FIG. 17 is a diagram illustrating an example of a positional relationship between radio apparatuses 201 to 204 and points A to G at a time when the positional radio information stored in the positional radio information storage unit 530 has been obtained. FIG. 18 is a diagram illustrating an example of positional radio information 1500 stored in the positional radio information storage unit 530. More specifically, the positional radio information 1500 indicates radio field intensities of radio signals received from the radio apparatuses 201 to 204 at the points A to G.

The positional radio information is preferably created by actually measuring radio field intensities at each point in the institution 100. Alternatively, the positional radio information may be created by estimating radio field intensities at each point on the basis of positions at which radio apparatuses are arranged.

The position determination unit 540 determines the position of the reception terminal 300 using the radio information obtained by the radio information obtaining unit 520. The position determination unit 540 determines the position of the reception terminal 300 on the basis of the radio information obtained by the radio information obtaining unit 520 and the positional radio information 1500 stored in the positional radio information storage unit 530.

That is, the position determination unit 540 refers to a table (positional radio information 1500) in which a plurality of points and radio field intensities of radio signals output from a plurality of radio apparatuses at the plurality of points are associated with each other. The position determination unit 540 then determines the position of the reception terminal 300 on the basis of the radio field intensities of the plurality of radio apparatus identified by identification information included in radio information obtained by the radio information obtaining unit 520 and the radio field intensities of the plurality of radio apparatuses at each of the plurality of points read from the table. More specifically, the position determination unit 540 sums the absolute values of differences between the radio field intensities of the plurality of radio apparatuses identified by the identification information included in the radio information obtained by the radio information obtaining unit 520 and the radio field intensities of the plurality of radio apparatuses at each of the plurality of points read from the table, and determines a point at which a smallest sum is obtained as the position of the reception terminal 300.

FIG. 19 is a diagram illustrating an example of radio information received by the reception terminal 300 at a certain point X. The reception terminal 300 outputs, for example, radio information 1600 illustrated in FIG. 19, and the positional information management server 500 obtains the radio information 1600. As illustrated in FIG. 19, at the point X, the radio field intensity of the radio apparatus 201 is −79, the radio field intensity of the radio apparatus 202 is −62, the radio field intensity of the radio apparatus 203 is −74, and the radio field intensity of the radio apparatus 204 is −91.

In this case, the position determination unit 540 calculates the sum of the absolute values of differences between the radio field intensities of the radio apparatuses 201 to 204 included in the positional radio information 1500 illustrated in FIG. 18 and the radio field intensities of the radio apparatuses 201 to 204 included in the radio information 1600 at each of the points A to G, and determines one of the points A to G at which a smallest sum is obtained as the current position.

For example, the sum of the absolute values of the differences between the radio field intensities of the radio apparatuses 201 to 204 at the point A and the radio field intensities of the radio apparatuses 201 to 204 at the point X is $|(-60-(-79))|+|(-80-(-62))|+|(-75-(-74))|+|(-81-(-91))|=48$. In addition, the sum of the absolute values of the differences between the radio field intensities of the radio apparatuses 201 to 204 at the point C and the radio field intensities of the radio apparatuses 201 to 204 at the point X is $|(-78-(-79))|+|(-61-(-62))|+(-75-(-74))|+|(-90-(-91))|=4$.

As a result of the calculation of the sum of the absolute values of the differences between the radio field intensities at the point X and the radio field intensities at each of the points A to G, the sum of the absolute values of the differences between the radio field intensities at the point X and the radio field intensities at the point C is the smallest. Therefore, the position determination unit 540 determines the point C as the current position of the reception terminal 300 corresponding to the radio information 1600.

The positional information transmission unit 550 transmits the position determined by the position determination unit 540 to the reception terminal 300 as positional information.

The positional information may be represented by values indicating latitude and longitude as absolute values, or may be represented as a position (distance) relative to a reference point in a certain map. The positional information may be represented in any way. In addition, the positional information may include a vertical position. The vertical position may be represented by height (meters, centimeters, or the like) above sea level, or may be represented by a floor number of a building. The vertical position may be represented in any way.

Although the radio apparatuses 201 to 204 illustrated in FIG. 17 are arranged in a line, the position determination unit 540 can determine the position of the reception terminal 300 regardless of the layout of a plurality of radio apparatuses, even if the plurality of radio apparatuses are arranged on a flat surface in two dimensions.

Figure 20:
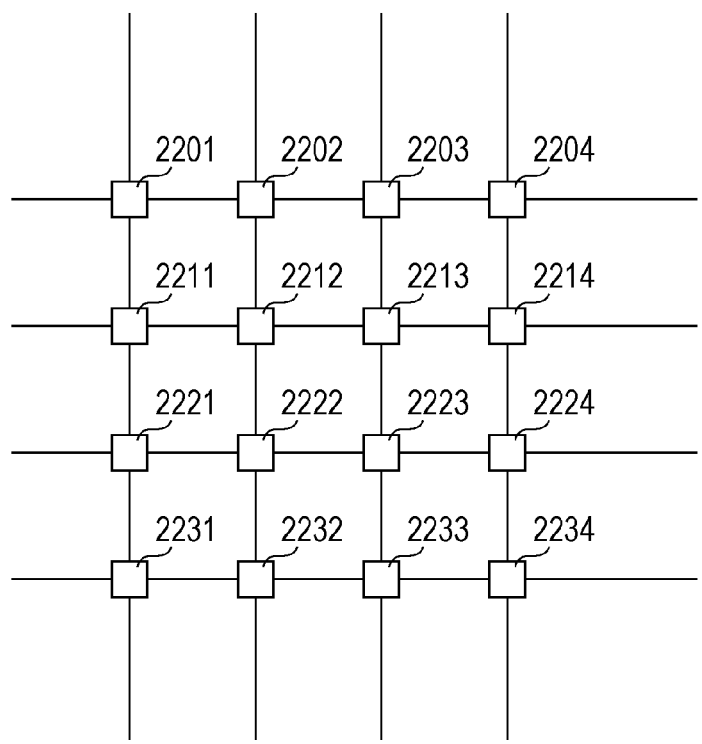
FIG. 20 is a diagram illustrating an example in which a plurality of radio apparatuses are arranged on a flat surface.

FIG. 20 is a diagram illustrating an example in which a plurality of radio apparatuses are arranged on a flat surface. As illustrated in FIG. 20, a plurality of radio apparatuses 2201 to 2234 are arranged on the flat surface. Each of the plurality of radio apparatuses 2201 to 2234 is arranged at an intersection between one of a plurality of longitudinal lines and one of a plurality of lateral lines that are perpendicular to each other. The plurality of radio apparatuses 2201 to 2234 illustrated in FIG. 20 are arranged, for example, on a ceiling. In FIG. 20, the plurality of radio apparatuses 2201 to 2234 are viewed from above.

In this case, the position determination unit 540 can determine one of a plurality of points on, among the plurality of lines, a certain line closest to the reception terminal 300 using only positional radio information regarding a plurality of radio apparatuses arranged on the certain line. That is, the position determination unit 540 can determine the position of the reception terminal 300 independently in a longitudinal direction and in a lateral direction by determining a point on one of the plurality of longitudinal lines closest to the reception terminal 300 and a point on one of the plurality of lateral lines closest to the reception terminal 300.

Thus, the position determination unit 540 may determine the position of the reception terminal 300 in each line, or may determine the position of the reception terminal 300 using the plurality of points on the flat surface and the radio field intensities of the plurality of radio apparatuses, regardless of the lines.

Figure 21:
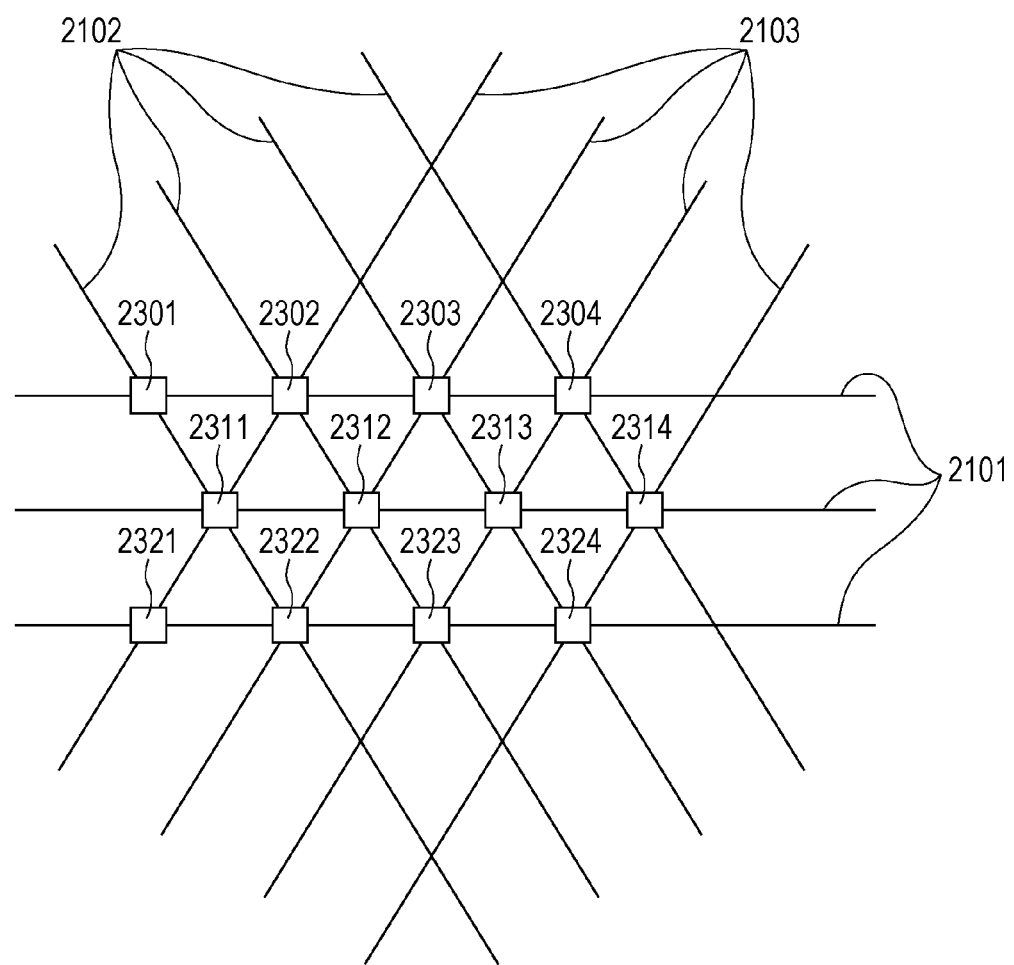
FIG. 21 is a diagram illustrating another example in which a plurality of radio apparatuses are arranged on a flat surface.

Although the plurality of radio apparatuses are arranged at the intersections between the longitudinal lines and the lateral lines, the present disclosure is not limited to this. FIG. 21 is a diagram illustrating another example in which a plurality of radio apparatuses are arranged on a flat surface.

As illustrated in FIG. 21, a plurality of radio apparatuses 2301 to 2324 are arranged on the flat surface. The plurality of radio apparatuses 2301 to 2324 are arranged at vertices of equilateral triangles formed by a plurality of first lines 2101 parallel to one another, a plurality of second lines 2102 that are parallel to one another and that intersect the plurality of first lines 2101 at 60 degrees, and a plurality of third lines 2103 that are parallel to one another and that intersect the plurality of first lines 2101 at 120 degrees. The plurality of radio apparatuses 2301 to 2324 illustrated in FIG. 21 are arranged, for example, on a ceiling. In FIG. 21, the plurality of radio apparatuses 2301 to 2324 are viewed from above.

In this case, the position determination unit 540 can determine one of a plurality of points on, among the plurality of lines, a certain line closest to the reception terminal 300 using only positional radio information regarding a plurality of radio apparatuses arranged on the certain line. That is, the position determination unit 540 can determine the position of the reception terminal 300 independently in three directions by determining a point on one of the plurality of first lines 2101 closest to the reception terminal 300, a point on one of the plurality of second lines 2102 closest to the reception terminal 300, and a point on one of the plurality of third lines 2103 closest to the reception terminal 300.

Configuration of Mobile Phone Base Station 600

The specific configuration of the mobile phone base station 600 is not illustrated in the drawings. If the reception terminal 300 is a smartphone or a mobile phone, the mobile phone base station 600 serves as a facility for relaying data communication with the application server 400 or the positional information management server 500 using a radio communication function.

Configuration of Internet 700

The specific configuration of the Internet 700 is not illustrated in the drawings. The Internet 700 is a system for relating data communication between the reception terminal 300 and the application server 400, data communication between the reception terminal 300 and the positional information management server 500, and the data communication between the application server 400 and the positional information management server 500.

Processing Flow of Position Measurement System

Figure 22:
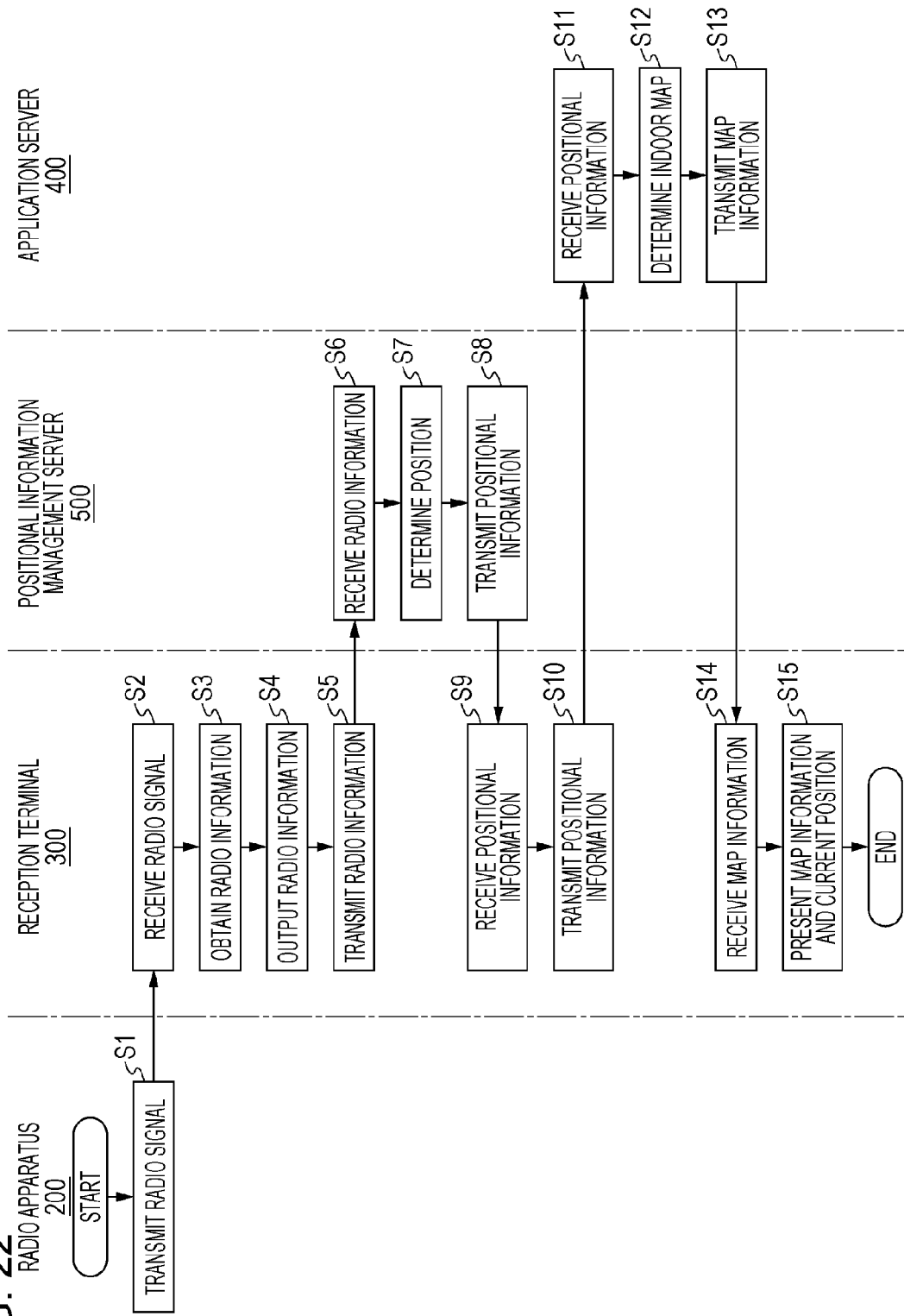
FIG. 22 is a diagram illustrating an example of a processing flow of the position measurement system according to the embodiment.

FIG. 22 is a diagram illustrating an example of a processing flow of the position measurement system according to this embodiment.

First, the antenna 250 of the radio apparatus 200 transmits a radio signal (step S1). The radio apparatus 200 regularly transmits a radio signal.

Next, the radio reception unit 360 of the reception terminal 300 receives the radio signal transmitted from the radio apparatus 200 and measures the radio field intensity of the received radio signal (step S2). The radio reception unit 360 obtains, from the received radio signal, an ID for identifying the radio apparatus 200 and creates radio information in which the obtained ID and the radio field intensity of the radio signal measured at the time of the reception are associated with each other.

The radio reception unit 360 receives radio signals from a plurality of radio apparatuses located around the reception terminal 300 and measures of the radio field intensities of the radio signals. The radio reception unit 360 then obtains IDs from the plurality of received radio signals and creates radio information in which the obtained IDs and the radio field intensities of the radio signals measured at the time of the reception are associated with each other.

Next, the radio information obtaining section 371 of the reception terminal 300 obtains the radio information including the IDs and the radio field intensities from the radio reception unit 360 (step S3).

Next, the output unit 340 of the reception terminal 300 outputs the radio information (step S4). For example, the output unit 340 may display the radio information on the monitor, or may store the radio information in the memory. If the reception terminal 300 is a digital camera and does not have a communication function that uses a mobile phone network or a communication function that uses an Internet technology such as Wi-Fi, the radio information writing section 376 obtains a captured image and radio information. When the radio information writing section 376 records the image as an electronic file, the radio information writing section 376 may add the radio information as meta-information of the electronic file. The processing in step S4 may be omitted.

Next, the radio information transmission section 372 of the reception terminal 300 transmits the radio information to the positional information management server 500 (step S5).

Next, the communication unit 510 of the positional information management server 500 receives the radio information transmitted from the reception terminal 300 (step S6). The radio information obtaining unit 520 obtains the radio information received by the communication unit 510.

Next, the position determination unit 540 of the positional information management server 500 determines the position of the reception terminal 300 from which the radio information has been obtained on the basis of the received radio information and the positional radio information stored in the positional radio information storage unit 530 (step S7).

Next, the positional information transmission unit 550 of the positional information management server 500 transmits positional information indicating the position of the reception terminal 300 determined by the position determination unit 540 to the reception terminal 300 through the communication unit 510 (step S8).

Next, the communication unit 310 of the reception terminal 300 receives the positional information transmitted from the positional information management server 500 (step S9). The positional information obtaining section 373 obtains the positional information received by the communication unit 310.

Next, the positional information transmission section 374 of the reception terminal 300 transmits the received positional information to the application server 400 through the communication unit 310 (step S10).

Next, the communication unit 410 of the application server 400 receives the positional information transmitted from the reception terminal 300 (step S11).

Next, the program execution unit 430 of the application server 400 determines an indoor map corresponding to the received positional information (step S12).

Next, the program execution unit 430 transmits map information indicating the determined indoor map to the reception terminal 300 through the communication unit 410 (step S13).

Next, the communication unit 310 of the reception terminal 300 receives the map information transmitted from the application server 400 (step S14). The additional information obtaining section 375 obtains the map information received by the communication unit 310.

Next, the output unit 340 of the reception terminal 300 presents the received map information and the current position of the reception terminal 300 (step S15). The output unit 340 displays the indoor map on the monitor on the basis of the received map information and, after identifying the current position in the indoor map on the basis of the positional information, displays an icon indicating the current position in the indoor map.

Although the reception terminal 300 transmits positional information to the application server 400 and receives additional information (map information) from the application server 400 in this embodiment, the present disclosure is not particularly limited to this. The reception terminal 300 may store additional information (map information) in the memory in advance, read, from the memory, additional information corresponding to positional information received from the positional information management server 500, and display the read additional information. In this case, the application server 400 is not necessary.

Modifications (1) Although the institution 100 is an underground mall in this embodiment, the institution 100 may be anywhere outdoors where GPS signals are difficult to detect. For example, the institution 100 may be a commercial facility, an office facility, an arcade near a building, a shopping arcade, or the like. Furthermore, even in a place where GPS signals can be detected, the radio apparatuses 200 may be installed and the position measurement according to this embodiment may be performed along with position measurement that uses GPS signals.

Figure 23:
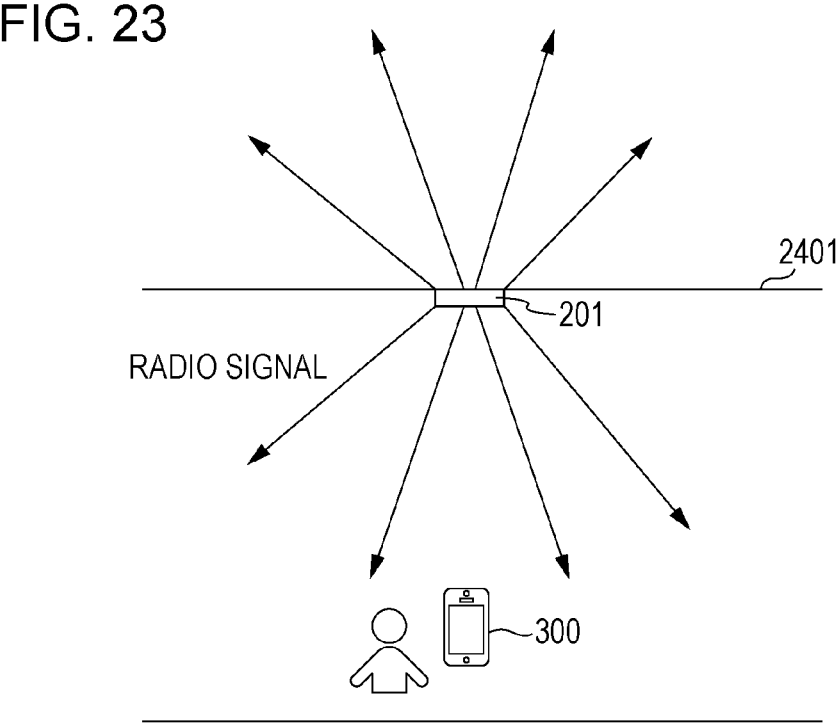
FIG. 23 is a diagram illustrating an example of a radio apparatus that outputs a radio signal that does not have directivity.
Figure 24:
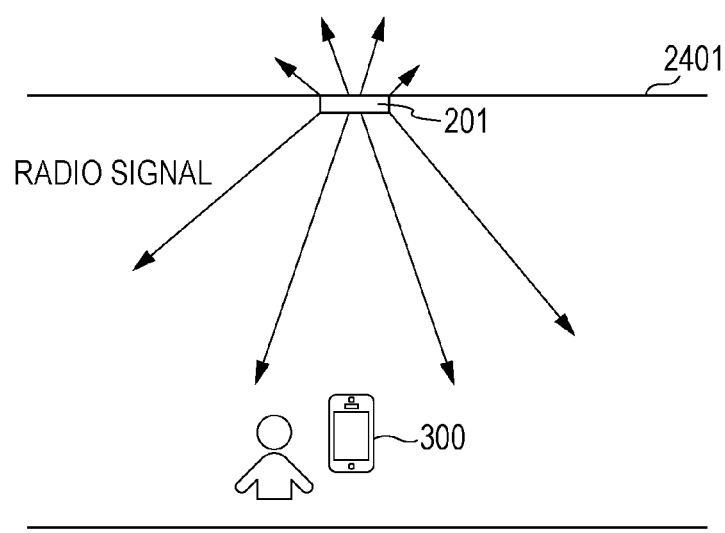
FIG. 24 is a diagram illustrating an example of a radio apparatus that outputs a radio signal having directivity.

(2) FIG. 23 is a diagram illustrating an example of a radio apparatus that outputs a radio signal that does not have directivity. FIG. 24 is a diagram illustrating an example of a radio apparatus that outputs a radio signal having directivity. As illustrated in FIG. 23, if a radio apparatus 201 is mounted on a ceiling 2401 and transmits a radio signal upward from the ceiling 2401, a reception terminal 300 used on an upper floor might receive the radio signal from the radio apparatus 201, which causes the reception terminal 300 to determine an incorrect floor as its current position. Therefore, as illustrated in FIG. 24, the radio apparatus 201 adjusts the directivity of the radio signal thereof and transmits the radio signal downward from the ceiling 2401. As a result, it is possible to prevent the radio signal from being transmitted to an upper floor, thereby avoiding incorrect measurement of the current position.

Figure 25:
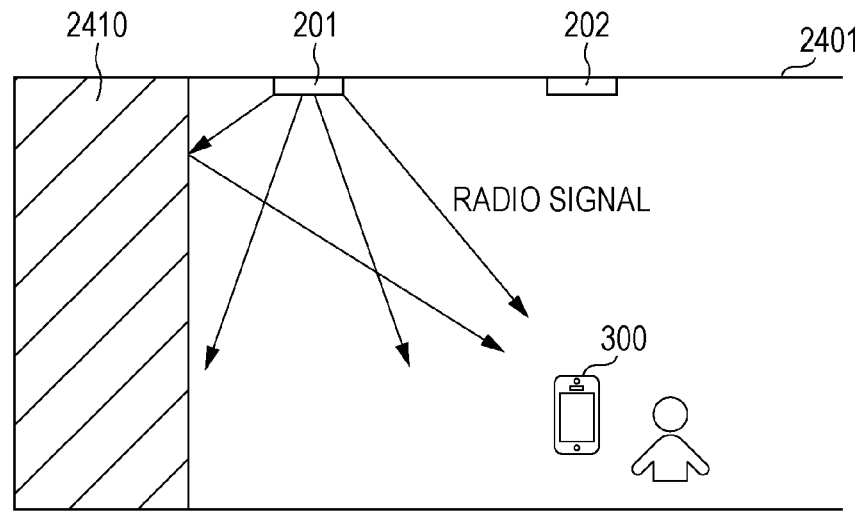
FIG. 25 is a diagram illustrating an example of a radio apparatus arranged near an obstacle.
Figure 26:
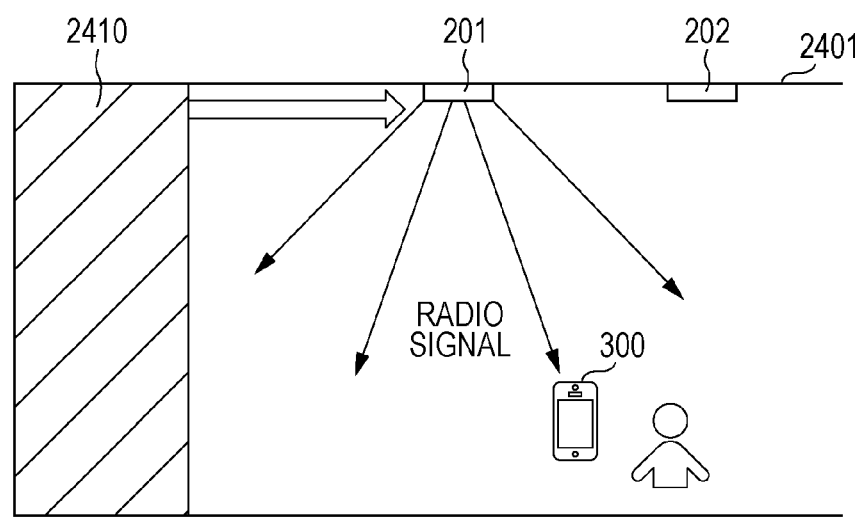
FIG. 26 is a diagram illustrating an example of a radio apparatus arranged at a distance from the obstacle.
Figure 27:
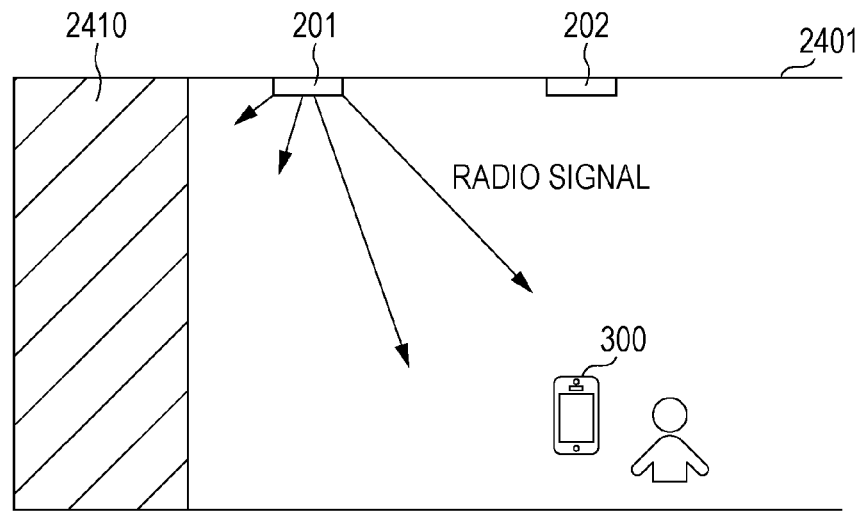
FIG. 27 is a diagram illustrating an example of a radio apparatus that is arranged near the obstacle and that outputs a radio signal having directivity.

(3) FIG. 25 is a diagram illustrating an example of a radio apparatus arranged near an obstacle. FIG. 26 is a diagram illustrating an example of a radio apparatus arranged at a distance from the obstacle. FIG. 27 is a diagram illustrating an example of a radio apparatus that is arranged near the obstacle and that outputs a radio signal having directivity. As illustrated in FIG. 25, an obstacle 2410, such as a wall, might reflect radio signals depending on the material characteristics thereof. For example, if a radio apparatus 201 is arranged near the obstacle 2410, a radio apparatus 202 is arranged at a distance from the obstacle 2410, and a reception terminal 300 is located below the radio apparatus 202, the radio field intensity of a radio signal from the radio apparatus 201, which is arranged near the obstacle 2410, might be higher than the radio field intensity of a radio signal from the radio apparatus 202.

Therefore, as illustrated in FIG. 26, it is preferable that the radio apparatus 201 is not arranged near the obstacle 2410 but arranged at a certain distance or farther from the obstacle 2410. As a result, the amplification of radio field intensity due to the obstacle 2410 can be suppressed, thereby increasing the accuracy of determining the position of the reception terminal 300.

In addition, as illustrated in FIG. 27, even if the radio apparatus 201 is arranged near the obstacle 2410, it is preferable that the directivity of the radio signal of the radio apparatus 201 is adjusted and the radio apparatus 201 transmits the radio signal in a direction opposite the obstacle 2410. That is, if the radio apparatus 201 is located near the obstacle (block) 2410 that blocks radio signals, the signal output unit 230 preferably transmits a radio signal in a direction opposite a direction in which the obstacle 2410 exists. In addition, if the radio apparatus 201 is located near the obstacle (block) 2410 that blocks radio signals, the signal output unit 230 preferably transmits a radio signal having directivity in the direction opposite the direction in which the obstacle 2410 exists. As a result, the amplification of radio field intensity due to the obstacle 2410 can be suppressed, thereby increasing the accuracy of determining the position of the reception terminal 300.

Figure 28:
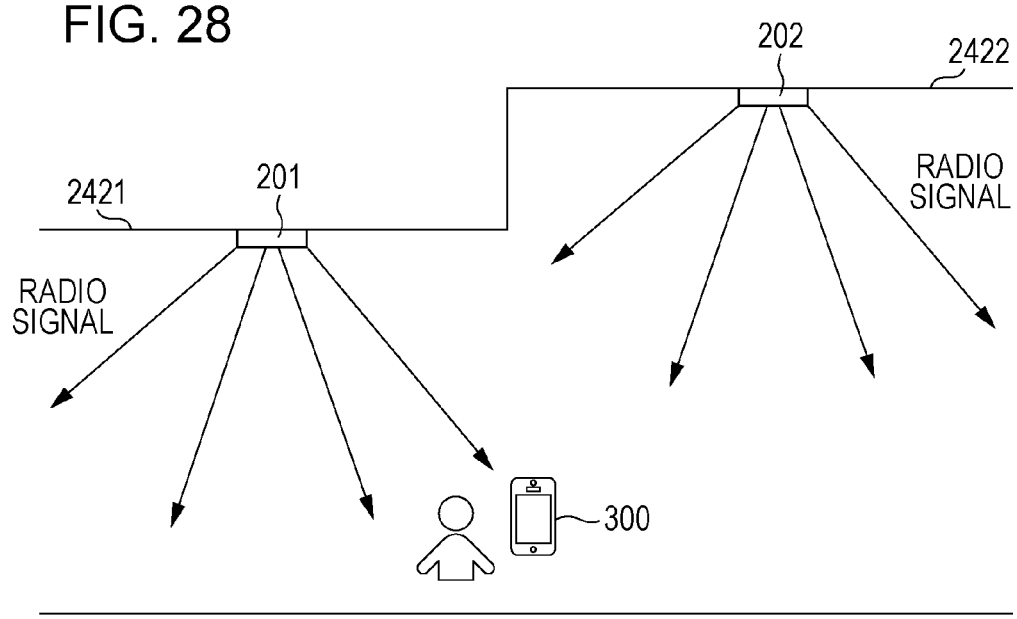
FIG. 28 is a diagram illustrating an example of two radio apparatuses that are arranged at different heights from a floor and that output radio signals having the same radio field intensity.
Figure 29:
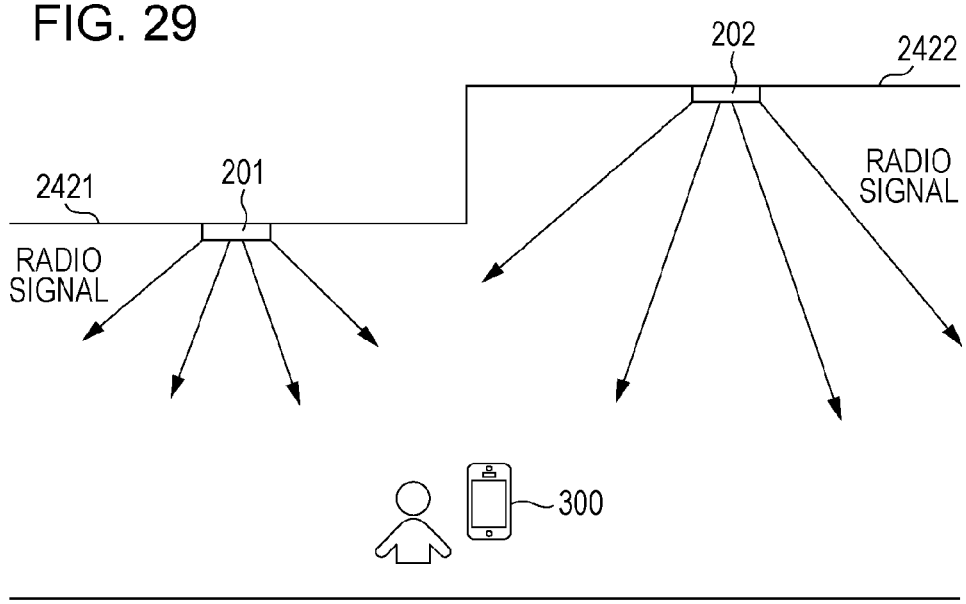
FIG. 29 is a diagram illustrating an example of two radio apparatuses that are arranged at different heights from a floor and that output radio signals having different radio field intensities.

(4) FIG. 28 is a diagram illustrating an example of two radio apparatuses that are arranged at different heights from a floor and that output radio signals having the same radio field intensity. FIG. 29 is a diagram illustrating an example of two radio apparatuses that are arranged at different heights from a floor and that output radio signals having different radio field intensities. As illustrated in FIG. 28, radio apparatuses 201 and 202 are arranged on ceilings 2421 and 2422, respectively, whose heights from the floor are different from each other. The ceiling 2422 is higher than the ceiling 2421. In this case, if the radio apparatuses 201 and 202 output the radio signals having the same radio field intensity, the radio field intensity of the radio signal transmitted from the radio apparatus 201 is higher than the radio field intensity of the radio signal transmitted from the radio apparatus 202. Therefore, incorrect positional information might be determined unless the radio field intensities are set in consideration of the heights from the floor.

Therefore, as illustrated in FIG. 29, the radio field intensity of the radio apparatus 201 is set lower than the radio field intensity of the radio apparatus 202 so that the radio field intensity of the radio signal of the radio apparatus 201 measured near the floor becomes the same as the radio field intensity of the radio signal of the radio apparatus 202. That is, each signal output unit 230 transmits a radio signal with a radio field intensity according to a distance between a position at which a corresponding radio apparatus is arranged and the floor. As a result, the accuracy of determining the position of the reception terminal 300 can be increased.

Figure 30:
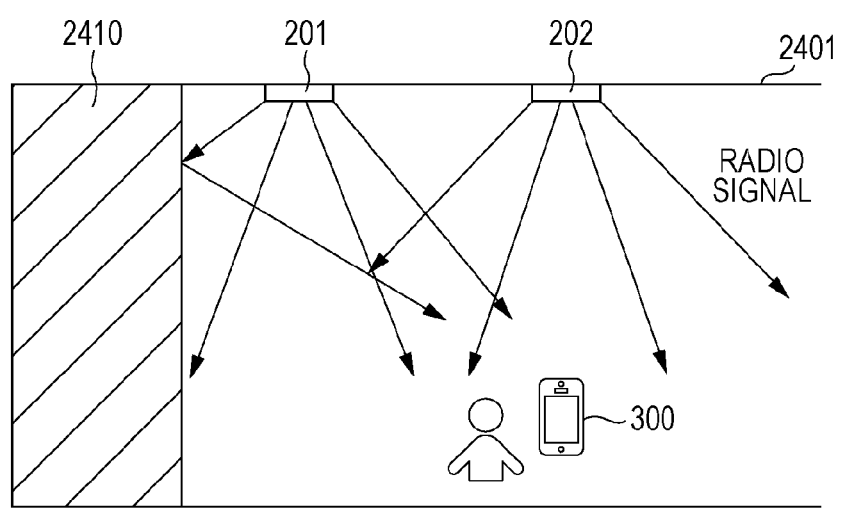
FIG. 30 is a diagram illustrating an example of a radio apparatus arranged near the obstacle.
Figure 31:
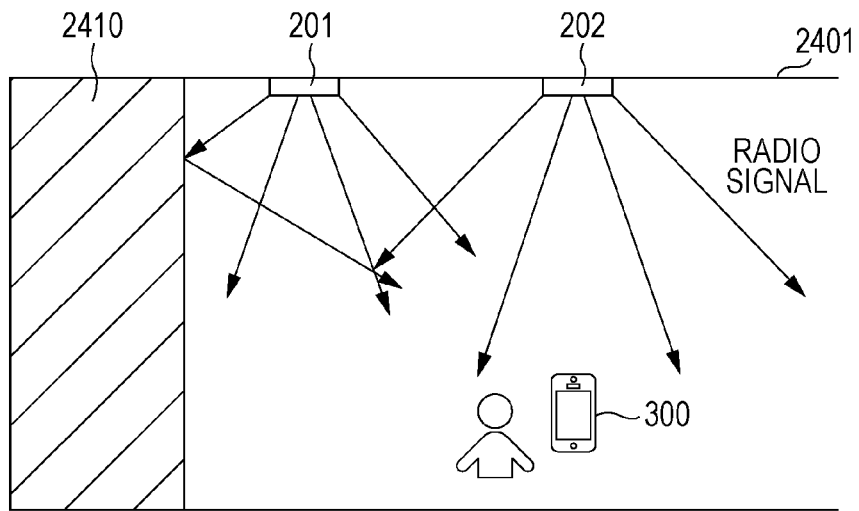
FIG. 31 is a diagram illustrating an example of a radio apparatus that is arranged near the obstacle and that outputs a radio signal whose radio field intensity has been decreased.

(5) FIG. 30 is a diagram illustrating an example of a radio apparatus arranged near the obstacle. FIG. 31 is a diagram illustrating an example of a radio apparatus that is arranged near the obstacle and that outputs a radio signal whose radio field intensity has been decreased. In FIG. 30, as described above, the obstacle 2410 might reflect radio signals, and the radio field intensity of a radio signal from the radio apparatus 201, which is arranged near the obstacle 2410, might be amplified. Therefore, in order to suppress the amplification of radio field intensity due to the obstacle 2410, the radio apparatus 201 illustrated in FIG. 26 is arranged at a certain distance from the obstacle 2410, and a direction in which the radio apparatus 201 illustrated in FIG. 27 transmits a radio signal is adjusted. On the other hand, as illustrated in FIG. 31, the amplification of radio field intensity due to the obstacle 2410 can be suppressed just by decreasing the radio field intensity of the radio apparatus 201 arranged near the obstacle 2410, thereby increasing the accuracy of determining the position of the reception terminal 300. That is, if the radio apparatus 201 is located near the obstacle (block) 2410 that blocks radio signals, the signal output unit 230 may decrease the radio field intensity.

Figure 32:
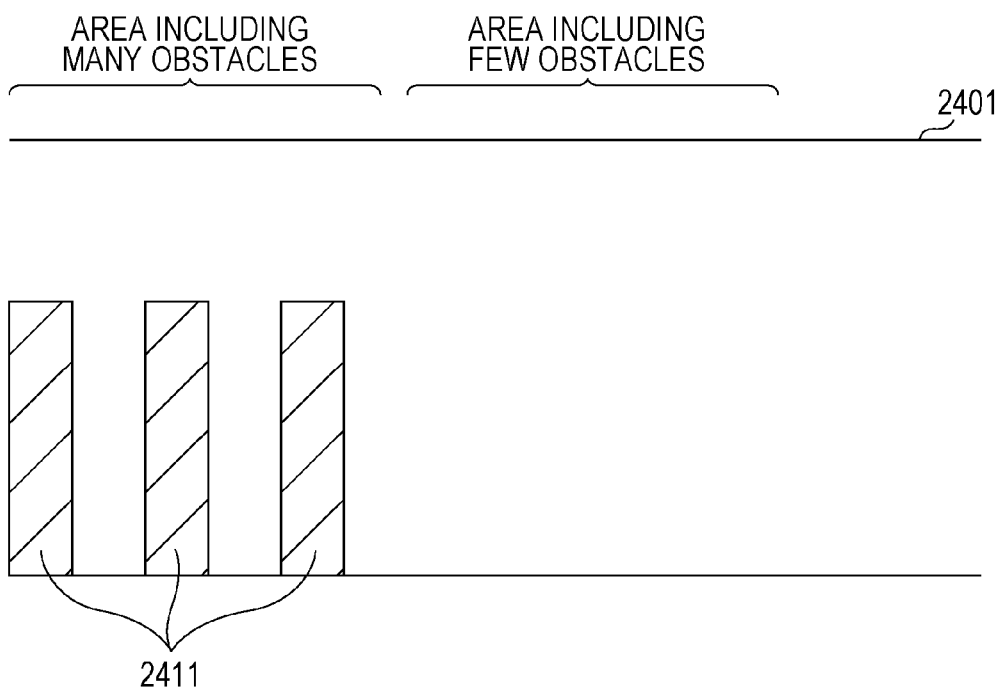
FIG. 32 is a diagram illustrating attenuation of radio field intensity due to obstacles.
Figure 33:
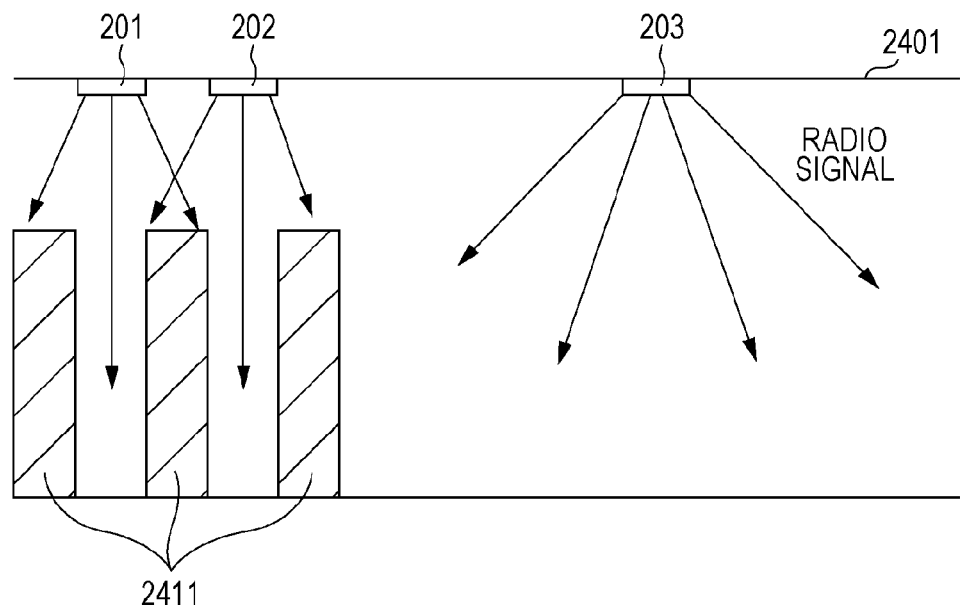
FIG. 33 is a diagram illustrating an example in which the number of radio apparatuses is changed in accordance with the number of obstacles.

(6) FIG. 32 is a diagram illustrating attenuation of radio field intensity due to obstacles. FIG. 33 is a diagram illustrating an example in which the number of radio apparatuses is changed in accordance with the number of obstacles. The amplification of radio field intensity due to an obstacle and measures against the amplification have been describe with reference to FIGS. 25 to 27, 30, and 31. In another case, if there are obstacles between the radio apparatus 201 and the reception terminal 300, the obstacles might block radio signals, thereby attenuating radio field intensity. If radio field intensity is attenuated, the accuracy of determining the position of the reception terminal 300 deteriorates. For example, a left area illustrated in FIG. 32 is an area including many obstacles 2411, and a right area illustrated in FIG. 32 is an area including few obstacles. If the reception terminal 300 passes by the area including many obstacles 2411, the radio field intensity of a radio signal received by the reception terminal 300 might be attenuated. On the other hand, if the reception terminal 300 passes by the area including few obstacles, the radio field intensity of a radio signal received by the reception terminal 300 is hardly attenuated.

Therefore, as illustrated in FIG. 33, the number of radio apparatuses arranged in the area including many obstacles 2411 is increased compared to the number of radio apparatuses arranged in the area including few obstacles. As a result, substantially the same accuracy of determining a position can be realized in the area including many obstacles 2411 and the area including few obstacles, thereby preventing deterioration of the accuracy of determining a position in the area including many obstacles 2411.

Figure 34:
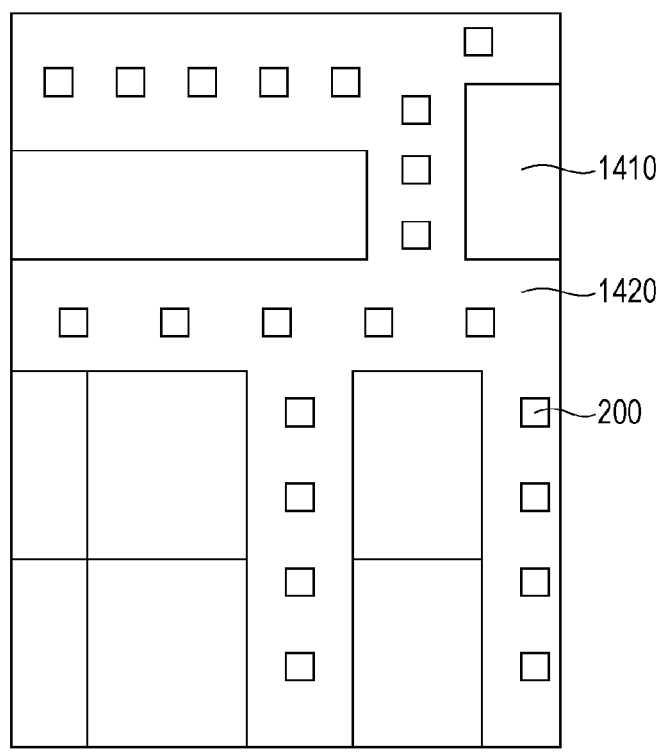
FIG. 34 is a diagram illustrating an example of the layout of radio apparatuses arranged in an indoor facility.

(7) FIG. 34 is a diagram illustrating an example of the layout of radio apparatuses 200 arranged in an indoor facility. As illustrated in FIG. 34, for example, the indoor facility includes a shop area 1410 including many obstacles and a passage area 1420 including few obstacles. Therefore, in space including both the shop area 1410 and the passage area 1420, the radio apparatuses 200 are preferably arranged along the center of the passage area 1420 as illustrated in FIG. 34. As a result, the attenuation of radio field intensity due to obstacles can be suppressed, thereby increasing the accuracy of determining the position of the reception terminal 300.

(8) Although the signal output unit 230 transmits a single ID (identification information) with a single radio field intensity in this embodiment, the present disclosure is not particularly limited to this. The signal output unit 230 may transmit a plurality of radio signals including different IDs (identification information) with different radio field intensities. For example, the signal output unit 230 transmits a first radio signal including a first ID with a first radio field intensity and a second radio signal including a second ID, which is different from the first ID, with a second radio field intensity, which is different from the first radio field intensity. At this time, the signal output unit 230 alternates between the first radio field intensity and the second radio field intensity to alternately transmit the first radio signal and the second radio signal.

As a result, if the reception terminal 300 is located close to the radio apparatus 200, the position of the reception terminal 300 is determined using a radio signal having a lower radio field intensity, and if the reception terminal 300 is located at a distance from the radio apparatus 200, the position of the reception terminal 300 is determined using a radio signal having a higher radio field intensity. Therefore, the radio signals can be detected within a wider range, thereby increasing the accuracy of determining the position of the reception terminal 300.

A method for measuring a position, a non-transitory recording medium storing a position measurement program, and a radio apparatus according to aspects of the present disclosure can improve the accuracy of measuring a current position even in a place where GPS signals are difficult to detect, and are effective as a method for measuring a position, a non-transitory recording medium storing a position measurement program, and a radio apparatus for measuring a current position.

What is claimed is:

1. A method for measuring a position, the method comprising:
    transmitting, using a radio apparatus, a radio signal including identification information for identifying the radio apparatus;
    receiving, by a reception apparatus, the radio signal including the identification information;
    obtaining radio information in which the identification information and a radio field intensity of the radio signal are associated with each other; and
    determining a position of the reception apparatus using the radio information,
    wherein the radio apparatus includes an antenna that transmits the radio signal having directivity toward a floor,
    wherein the radio apparatus includes a plurality of radio apparatuses, and
    wherein the determining includes:
        referring to a table in which each of a plurality of points and radio field intensities of radio signals output from the plurality of radio apparatuses at each of the plurality of points are associated with each other in advance, and
        determining the position of the reception apparatus based on the radio field intensities of the plurality of radio apparatuses identified by the identification information included in the radio information and the radio field intensities of the plurality of radio apparatuses at each of the plurality of points read from the table.

2. The method according to claim 1,
    wherein the antenna includes a planar substrate, a power feeding device for feeding power that is disposed on an output surface of the substrate, from which the radio signal is output, and a metal film that is disposed on a surface of the substrate opposite the output surface and that reflects the radio signal.

3. The method according to claim 2,
    wherein the power feeding device includes four power feeding elements arranged at corners of a rectangle.

4. The method according to claim 2,
    wherein the substrate is rectangular, and
    wherein the power feeding device includes four power feeding elements arranged at corners of the substrate.

5. The method according to claim 2,
    wherein the antenna is disposed along a periphery of the substrate and further includes a peripheral wall that reflects the output radio signal.

6. The method according to claim 2,
    wherein the power feeding device includes a plurality of power feeding elements, and
    wherein the antenna is disposed between the plurality of power feeding devices and further includes an inner wall that reflects the output radio signal.

7. The method according to claim 1,
    wherein, in the determining, absolute values of differences between the radio field intensities of the plurality of radio apparatuses identified by the identification information included in the radio information and the radio field intensities of the plurality of radio apparatuses at each of the plurality of points read from the table are summed, and a point at which a smallest sum is obtained is determined as the position of the reception apparatus.

8. The method according to claim 1,
    wherein, in the transmitting, the radio apparatus transmits a plurality of radio signals including different pieces of identification information with different radio field intensities.

9. The method according to claim 1,
    wherein, when the radio apparatus is located within a predetermined distance from a block that blocks the radio signal, the radio apparatus further includes a controller that decreases the radio field intensity in the step of transmitting.

10. The method according to claim 1,
    wherein, in the transmitting, the radio apparatus transmits the radio signal with a radio field intensity according to a distance between a position at which the radio apparatus is arranged and the floor.

11. The method according to claim 1,
    wherein, if the radio apparatus is located near a block that blocks the radio signal, the radio apparatus transmits, in the transmitting, the radio signal in a direction opposite a direction in which the block exists.

12. A computer-readable non-transitory recording medium storing a position measurement program, the position measurement program causing a computer to perform a process comprising:
    receiving a radio signal including identification information of a radio apparatus transmitting the radio signal;
    obtaining radio information in which the identification information and a radio field intensity of the radio signal are associated with each other; and
    determining a position of a reception apparatus using the obtained radio information,
    wherein the radio apparatus includes an antenna that transmits the radio signal having directivity toward a floor,
    wherein the radio apparatus includes a plurality of radio apparatuses, and
    wherein the determining includes:
        referring to a table in which each of a plurality of points and radio field intensities of radio signals output from the plurality of radio apparatuses at each of the plurality of points are associated with each other in advance, and determining the position of the reception apparatus based on the radio field intensities of the plurality of radio apparatuses identified by the identification information included in the radio information and the radio field intensities of the plurality of radio apparatuses at each of the plurality of points read from the table.

* * * * *